United States Patent
O'Hare et al.

(10) Patent No.: US 12,170,944 B2
(45) Date of Patent: *Dec. 17, 2024

(54) DISTRIBUTED CONTENT DELIVERY FOR MOVING DEVICES

(71) Applicant: Comcast Cable Communications, LLC, Philadelphia, PA (US)

(72) Inventors: David O'Hare, Greenwood Village, CO (US); Kenneth Grantham, Northglenn, CO (US); Irma Torero, Littleton, CO (US); Robert John, Centennial, CO (US); Lisa Wright, Aurora, CO (US); Jeffrey Stoller, Thornton, CO (US); Michael Toole, Commerce City, CO (US); Kristine Beach, Aurora, CO (US); Brent Vannier, Parker, CO (US); Terry Mahnke, Arvada, CO (US); Sandra Driscoll, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,493

(22) Filed: Sep. 22, 2023

(65) Prior Publication Data

US 2024/0205790 A1 Jun. 20, 2024

Related U.S. Application Data

(63) Continuation of application No. 14/668,254, filed on Mar. 25, 2015, now Pat. No. 11,805,467.

(51) Int. Cl.
*H04W 40/20* (2009.01)
*G01C 21/26* (2006.01)
(Continued)

(52) U.S. Cl.
CPC ............ *H04W 40/20* (2013.01); *G01C 21/26* (2013.01); *G01C 21/3461* (2013.01);
(Continued)

(58) Field of Classification Search
CPC ...... H04N 21/647; H04W 4/48; H04W 4/025; H04W 4/029; H04W 24/02; H04W 40/20;
(Continued)

(56) References Cited

U.S. PATENT DOCUMENTS

| 8,996,013 B2 | 3/2015 | Shumaker et al. |
| 9,086,291 B1 | 7/2015 | Bhatia et al. |

(Continued)

FOREIGN PATENT DOCUMENTS

EP 2658211 A1 10/2013

OTHER PUBLICATIONS

Extended European Search Report—EP App. 16161109.0—dated Aug. 1, 2016.
Apr. 19, 2022—Canadian Office Action—2,923,115.

*Primary Examiner* — Randy A Flynn
(74) *Attorney, Agent, or Firm* — Banner & Witcoff, Ltd.

(57) ABSTRACT

Methods, systems, computer-readable media, and apparatuses for providing distributed content to a mobile device (e.g., in a mobile vehicle) through multiple content access points along a particular route are presented. In some embodiments, a computing device may receive a selection of media content and a selection of a particular route from a plurality of routes to enable navigation of a mobile vehicle from a start point to an end point calculated based on at least a number of content access points along each route. A computing device may divide the media content into a plurality of segments and send each segment to a respective planned content access point of a plurality of planned content access points along the particular route. In some
(Continued)

embodiments, a mobile computing device within a mobile vehicle may receive a segment from each planned content access point to enable continuous uninterrupted playback of the media content.

28 Claims, 12 Drawing Sheets

(51) Int. Cl.
  *G01C 21/34* (2006.01)
  *H04L 65/612* (2022.01)
  *H04L 65/613* (2022.01)
  *H04L 65/75* (2022.01)
  *H04W 4/02* (2018.01)
  *H04W 4/029* (2018.01)
  *H04W 4/48* (2018.01)
  *H04W 24/02* (2009.01)

(52) U.S. Cl.
  CPC .......... *H04L 65/612* (2022.05); *H04L 65/613* (2022.05); *H04L 65/762* (2022.05); *H04W 4/025* (2013.01); *H04W 4/029* (2018.02); *H04W 4/48* (2018.02); *H04W 24/02* (2013.01)

(58) Field of Classification Search
  CPC ... G01C 21/26; G01C 21/3461; H04L 65/762; H04L 65/612; H04L 65/613
  See application file for complete search history.

(56) References Cited

U.S. PATENT DOCUMENTS

| | | | |
|---|---|---|---|
| 2009/0326810 A1* | 12/2009 | Callaghan | H04W 4/029 701/532 |
| 2010/0085947 A1* | 4/2010 | Ringland | H04W 28/0226 370/338 |
| 2010/0153001 A1* | 6/2010 | Bauchot | G01C 21/3867 701/533 |
| 2010/0177735 A1* | 7/2010 | Bihannic | H04L 65/80 370/331 |
| 2010/0248742 A1* | 9/2010 | Song | H04L 12/185 455/456.1 |
| 2012/0058742 A1* | 3/2012 | Razoumov | H04L 12/5691 455/406 |
| 2012/0113971 A1* | 5/2012 | Giaretta | H04W 48/20 370/338 |
| 2012/0147865 A1* | 6/2012 | Pothula | G01C 21/3461 725/62 |
| 2012/0182935 A1* | 7/2012 | Addepalli | H04W 40/20 370/328 |
| 2012/0190339 A1* | 7/2012 | Abe | H04W 48/16 455/411 |
| 2013/0238807 A1* | 9/2013 | Wakikawa | H04W 48/18 709/227 |
| 2013/0308470 A1* | 11/2013 | Bevan | H04W 64/006 370/252 |
| 2013/0332297 A1* | 12/2013 | Forutanpour | G01C 21/3461 705/26.1 |
| 2014/0057555 A1* | 2/2014 | Ling | H04H 40/90 455/12.1 |
| 2014/0078403 A1* | 3/2014 | Joslyn | H04N 21/6582 348/731 |
| 2014/0141743 A1* | 5/2014 | Shaw | H04W 4/027 455/405 |
| 2014/0171106 A1* | 6/2014 | Cheng | H04W 64/006 455/456.1 |
| 2014/0329504 A1* | 11/2014 | Gupta | H04W 48/18 455/411 |
| 2015/0106312 A1* | 4/2015 | Chen | H04W 4/029 706/21 |
| 2015/0142914 A1* | 5/2015 | Lau | H04B 7/024 709/217 |
| 2015/0256581 A1* | 9/2015 | Kolhi | H04L 65/80 709/219 |
| 2015/0281303 A1* | 10/2015 | Yousef | H04N 21/26258 709/219 |
| 2016/0057199 A1* | 2/2016 | Aziz | H04L 51/10 709/204 |
| 2016/0065995 A1* | 3/2016 | Phillips | H04N 21/25841 725/62 |

* cited by examiner

DISTRIBUTED CONTENT DELIVERY FOR MOVING DEVICES

CROSS-REFERENCE TO RELATED APPLICATIONS

This application is a continuation of U.S. patent application Ser. No. 14/668,254, filed on Mar. 25, 2015. The above-referenced application is hereby incorporated by reference in its entirety.

BACKGROUND

Increasingly, as media playback devices (e.g., cell phones, tablets, computers, in-vehicle entertainment systems) become more prevalent, there are many different devices by which occupants of a mobile vehicle may want to play and/or obtain content (e.g., video, music, etc.) while in the moving vehicle. In some instances, the media playback device may not have cellular connection capabilities. For example, some tablets may only have WIFI and Bluetooth wireless connections and may not have a cellular connection (e.g., 3G, 4G, LTE, etc.). In some instances, even when a media playback device has cellular connection capabilities, the user of the device may have already exceeded the data limit of her data plan with a cellular data provider and thereby may only obtain the content at a price higher than the price for the original data limit of her plan and/or may be limited in obtaining the data needed to retrieve the content. For example, the device may be prevented from obtaining the data or may be "throttled" back (i.e., permitted to obtain data at a reduced data speed) by the cellular data provider.

In some instances, the media playback device might not be able to obtain the content for uninterrupted playback of the content over the cellular connection. For example, the media playback device may be unable to continuously play the content while the content is being streamed when there is, for example, insufficient signal strength, interference from other devices connected to the network, limited bandwidth of a frequency block used by the device, and/or too many data users at a given time causing the network to become overloaded. As a result, users may have to inconveniently select and obtain the content prior to moving, such as by a motor vehicle.

SUMMARY

Aspects of the disclosure relate to computer hardware and software. In particular, one or more aspects of the disclosure generally relate to computer hardware and software for providing distributed content to a mobile vehicle through multiple content access points along a particular route of the mobile vehicle.

Various aspects of the disclosure provide more efficient, effective, functional, and convenient ways of providing media content to occupants who are moving either manually or in moving vehicles. In particular, in one or more embodiments discussed in greater detail below, content distribution management functionalities are implemented, and/or used in a number of different ways to provide one or more of these and/or other advantages.

In some embodiments, a computing device may receive a selection of media content and a selection of a particular route from a plurality of routes to enable navigation of a mobile vehicle from a start point to an end point calculated based on at least a number of content access points along each route. A computing device may divide the media content into a plurality of segments and send each segment to a respective planned content access point of a plurality of planned content access points along the particular route.

In some embodiments, a computing device may determine that a mobile vehicle is at an approximate geographic location different from a predicted geographic location at a specific time as the mobile vehicle traverses a particular route. The computing device may send at least one segment, of a plurality of segments of a media content item, assigned to be sent to a first planned content access point to one of a second planned content access point along the particular route and a new content access point.

In some embodiments, a mobile computing device, located within a mobile vehicle, may receive a segment of a plurality of segments of media content from each planned content access point of a plurality of planned content access points as the mobile vehicle traverses a particular route determined based on a location of each planned content access point to enable continuous playback of the media content.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

Figure 1:
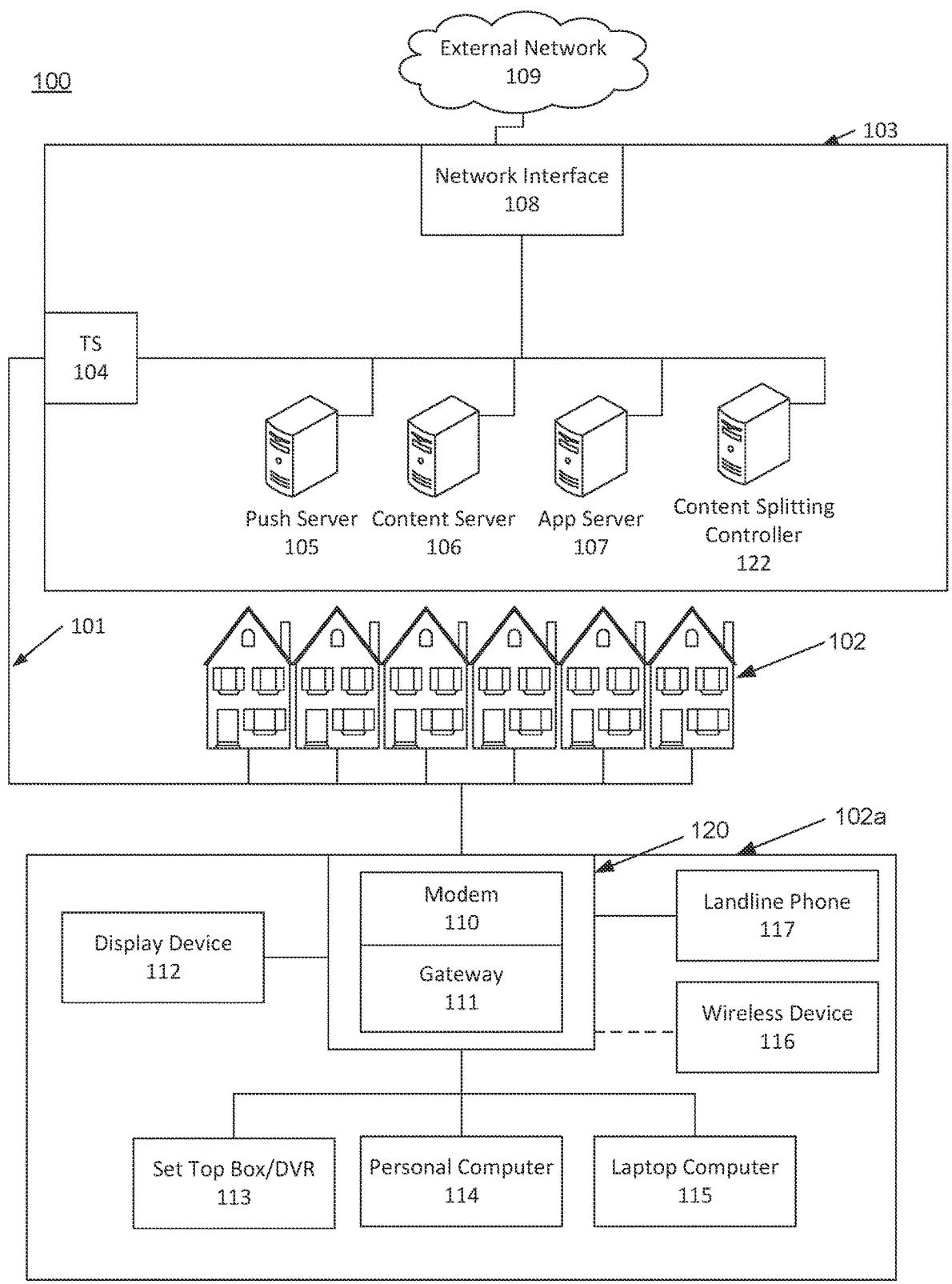
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), landline phones 117 (e.g. Voice over Internet Protocol-VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The local office 103 may include a content splitting controller 122 (also referred to herein as a native broadcast content provider, broadcast content provider, and broadcast computing device). Although shown separately, the content splitting controller 122 may be combined with one or more of the push server 105, the content server 106, and the application server 107. The content splitting controller 122 may coordinate distribution of content items to a mobile vehicle (not shown) traveling along a route. For example, the content splitting controller 122 may determine one or more routes using a fuzzy logic algorithm based on, for example, information received from the mobile vehicle (e.g., start and end points, content selections, and the like), preferences of the vehicle occupant, status information of devices in one or more premises 102 along each possible route, and/or network coverage along the route. The content splitting controller 122 may send possible routes to the mobile vehicle and, in response, may receive a route selection. The content splitting controller 122 may divide the selected content items into segments and send the segments to premises 102 along the selected route at a predicted time when the mobile vehicle will be within a predefined distance or determined distance of the premise 102. The mobile vehicle may receive each segment from the premises 102 as the mobile vehicle passes each premise 102 along the route. As a result, a mobile computing device (e.g., a media player) within the mobile vehicle may play the content items without interruption as the mobile vehicle traverses the route.

Figure 2:
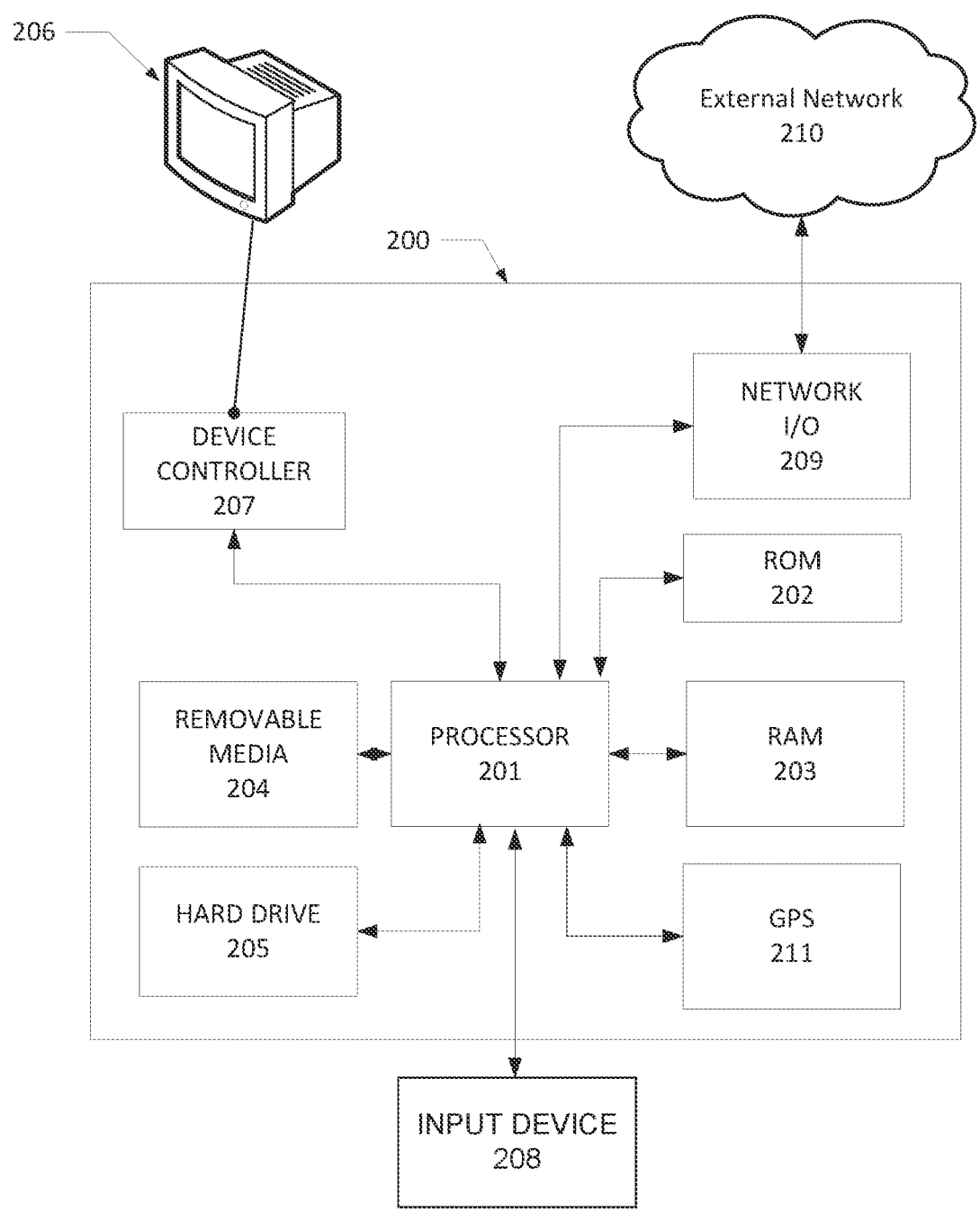
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Content Distribution Architecture and Features

Figure 3:
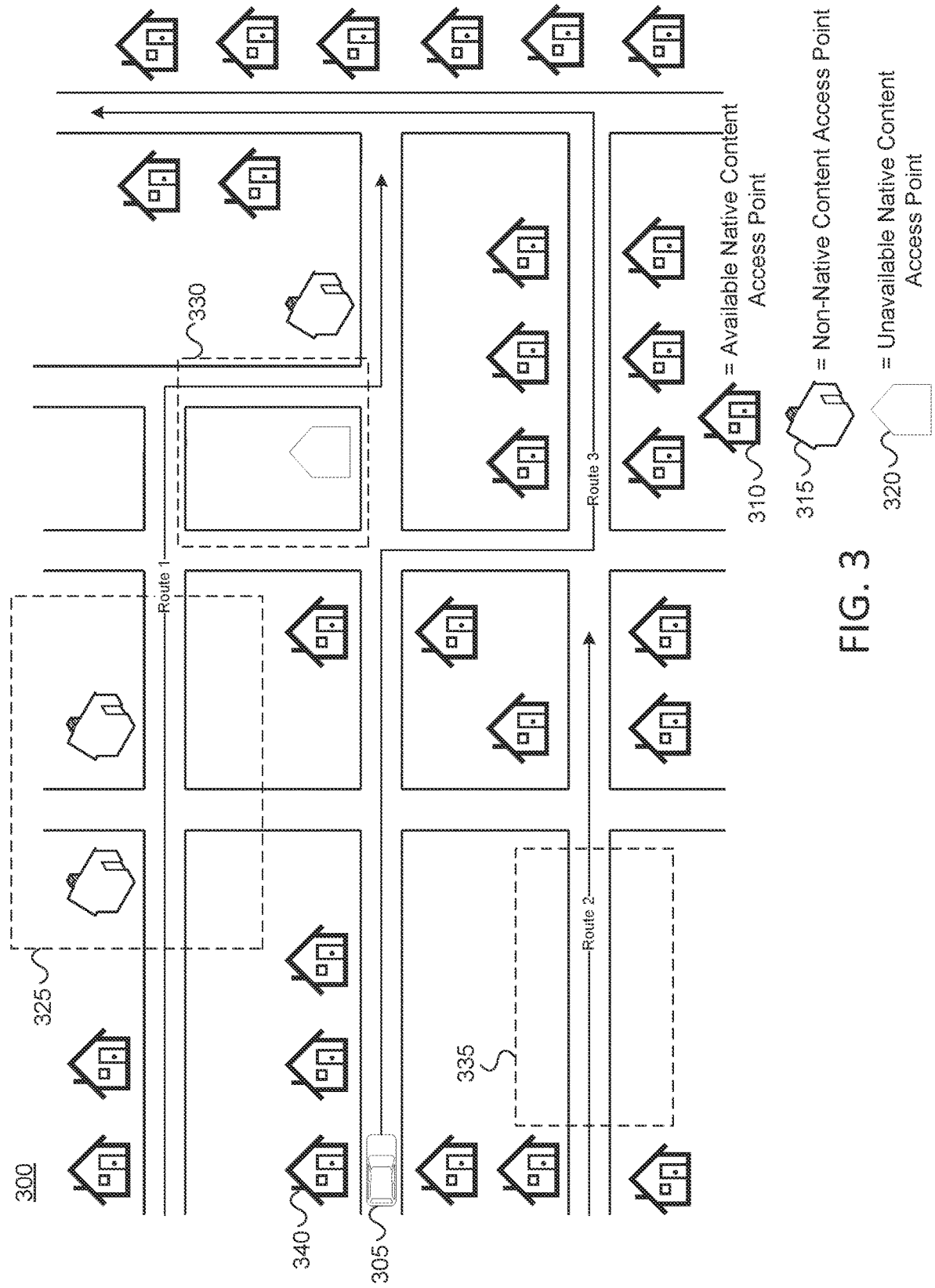
FIG. 3 illustrates an example of a system diagram for evaluating potential routes that can be used to implement of any of the various features described herein.

FIG. 3 illustrates an example of a system diagram for evaluating potential routes that can be used to implement of any of the various features described herein. The system 300 may include a mobile vehicle 305. An occupant (e.g., the driver or passenger if in a self-driving vehicle) of the mobile vehicle 305 may wish to travel from a start point (e.g., a starting location of the mobile vehicle 305 such as the residence of the driver) to an end point (e.g., a destination location of the mobile vehicle). One or more occupants (e.g., passengers) of the mobile vehicle may wish to obtain from a native broadcast content provider one or more content items (e.g., one or more video and/or music files and/or other content files) to be played by one or more mobile computing devices (not shown) within the mobile vehicle 305. For example, one or more of the occupants may be a subscriber (or customer) of the native broadcast content provider (also referred to herein as a broadcast content provider). The one or more mobile computing device may be a mobile vehicle navigation and/or entertainment system located within the mobile vehicle, a cellular phone, a tablet, a laptop, a computer, or another mobile computing device.

In such instances, each occupant may select one or more of the start point of the mobile vehicle 305, the end point of the mobile vehicle 305, and one or more content items for playback while the mobile vehicle 305 is in transit between the start point and the end point. The mobile computing device may initiate a communication session with the native broadcast content provider (e.g., by exchanging security credentials or tokens). The mobile computing device may send the selections to the native broadcast content provider (not shown). For example, the mobile vehicle 305 may establish a connection with a nearby (e.g., within a predefined distance) content access point 340 connected with the native broadcast content provider and may send the selections to the native broadcast content provider through the nearby content access point 340. The native broadcast content provider may determine and optionally plot all possible routes (e.g., roads, streets, highways) between a start point and an end point. For example, the broadcast content provider may determine at least three possible routes between the start point and the end point. In some embodiments, a fuzzy logic algorithm executed at the broadcast content provider may be used to determine all available routes. In some embodiments, the native broadcast provider may send the start point and end point to another entity (e.g., traffic profile services) and, in response, may receive the possible routes and optionally estimated travel times along each route at different times of day.

The native broadcast content provider may evaluate each possible route based on a fuzzy logic algorithm to determine possible routes where a mobile computing device within the mobile vehicle 305 may receive segments (or portions) of the content items from multiple available content access points 310 along the route to enable continuous uninterrupted playback of the content items by the mobile computing device for the occupants to view and/or listen. In other words, the fuzzy logic algorithm may determine whether a route has a sufficient number available content access points 310 to supply segments of the content items to the mobile vehicle 305 without having an interrupt or delay the playback of the content items.

For example, the native broadcast content provider may evaluate route 1 using the fuzzy logic algorithm. Particularly, the broadcast content provider may identify area 325 that might not include sufficient available native content access points 310 to provide segments to the mobile vehicle 305 for continuous uninterrupted playback of the content items. The native broadcast content provider may be associated with the available native content access points 310. For example, the available native content access points 310 may be residences of subscribers (or customers) of the native broadcast content provider. In some embodiments, the native broadcast content provider might not be able to provide segments of the content to the non-native content access points 315 to transfer to the mobile vehicle 305. The non-native content access points 315 may be associated with a non-native broadcast content provider different from the native broadcast provider. In such embodiments, the native broadcast content provider may eliminate route 1 as one of the possible routes because route 1 will result in interruptions in the playback of the content items by the mobile computing device as the mobile vehicle 305 traverses area 325. In alternative embodiments, the broadcast provider may be able to send segments of the content items to the non-native content access points 315 as discussed below in FIG. 12. For example, if there is insufficient native coverage, the native broadcast content provider may request capacity from the non-native broadcast content provider for capacity on their foreign network (e.g., by requesting to access and utilize the non-native content access points if they, for example, have unused network memory and a fast connection). In response, the native broadcast content provider may receive one or more routes and/or permission to access one or more non-native content access points from the non-native broadcast content provider. In such embodiments, at least a portion of route 1 in area 325 might not be eliminated as a possible route if there are sufficient non-native content access points 315 to enable continuous uninterrupted playback of the content items by the mobile computing device.

Additionally, in evaluating route 1, the native broadcast content provider may identify area 330 that might not include sufficient available native content access points 310 to provide segments to the mobile vehicle 305 for continuous uninterrupted playback of the content items. For example, the native broadcast content provider may identify unavailable native content access points 320. The unavailable content access points 320 may be unavailable because, for example, they may lack sufficient network storage to store a segment of content (e.g., the memory of a DVR at this residence may be filled), they may have a weak signal or a down transmitter, and the like. In such instances, the native broadcast content provider may eliminate route 1 as one of the possible routes because route 1 will result in interruptions in the playback of the content items by the mobile computing device as the mobile vehicle 305 traverses area 330.

For example, the native broadcast content provider may evaluate route 2 using the fuzzy logic algorithm. Particularly, the native broadcast content provider may identify area 335 that might not include sufficient number (e.g., a particular density) of available native content access points 310 to provide segments to the mobile vehicle 305 for continuous uninterrupted playback of the content items. In other words the distance between two available content access points 310 located on either edge of area 335 may be above a predefined distance or a distance determined by the fuzzy logic algorithm. In such instances, the native broadcast content provider may eliminate route 2 as one of the possible routes because route 2 will result in interruptions in the playback of the content items by the mobile computing device as the mobile vehicle 305 traverses area 335.

For example, the native broadcast content provider may evaluate route 3 using the fuzzy logic algorithm. Particularly, the broadcast content provider may determine that route 3 has a sufficient number (e.g., a particular density) of available native content access points 310 to provide segments to the mobile vehicle 305 for continuous uninterrupted playback of the content items. In other words, route 3 is one route where the broadcast content provider may provide the mobile vehicle 305 with consistent coverage based on the locations of the available native content access points. Route 3 may be considered a selectable route. In some embodiments, there may be multiple selectable routes.

In other words, the determination of selectable routes may be based on an evaluation of the presence and capacity of content access points (e.g., transmitters) along each possible route. For example, the broadcast content provider may, using the fuzzy logic algorithm, evaluate the congestion, speed, bandwidth (e.g., throughput) and signal strength at each of the content access points along the route. The broadcast content provider may evaluate if there are geographic gaps in coverage where there is no or limited native coverage by the broadcast content provider (e.g., distance between two available broadcast content provider). In such instances, the broadcast computing device may evaluate potential handoffs to a non-native network (e.g., a network of another broadcast service provider). Further, the determination of selectable routes may be based on any received information from the non-native broadcast content provider including, for example, any information discussed herein with respect to the non-native content access points 315 and route information.

While the above determinations where based on the number of available native content access points 310 along the routes, the fuzzy logic algorithm may account for numerous other factors in addition to or in lieu of the number of available native content access points 310. For example, the determination of selectable routes may be based on navigational options received from the mobile computing device within the mobile vehicle 305 such as, for example, an indication to avoid highways, tolls, high occupancy vehicle lanes at particular times, and/or an indication to use a fastest route. The determination of selectable routes may be based on advertising positions along the possible routes.

The determination of selectable routes may be based on an evaluation of the content items including, for example, a quality level preferred by the occupants (e.g., the occupants prefer high definition content), a quality level able to be provided by the content access points, the duration of the content items (e.g., a movie that is 2 hours in length), and a format of the content items. For example, for each possible route, the broadcast content provider may determine whether there are sufficient content access points, bandwidth, signal speed, and network storage available to store and transmit segments of content of a particular quality level (e.g., high definition content, standard definition content, and low definition content). For example, content items may be played in high-definition if a selected route has many content access points while the content items may be played in either standard definition or low definition if another route is selected that has fewer content access points.

The determination of selectable routes may be based on an evaluation by the broadcast content provider of the nature of each of the possible routes including, for example, the speed limit of each portion of the route, typical speed of a mobile vehicle along each portion of the route at a specific time of day, any actual real-time data regarding traffic conditions along the routes, and the duration of each route. Additionally, the determination of selectable routes may be based on an expected (e.g., predicted) duration the mobile computing device is expected to be connected to each particular content access point based on a predicted speed of the mobile vehicle 305 as it passes each content access point. The determination of the selectable routes may be based on additional information entered into a GPS system within the car and/or based on learned behavior from past routes using artificial intelligence and past commuting behavior. The fuzzy logic algorithm may account for whether it is a holiday, weekday, or weekend.

The determination of selectable routes may be based on the capabilities of the mobile computing device within the mobile vehicle. For example, download capacity of a mobile computing device (e.g., a receiver) may be taken into account.

The determination of selectable routes may be based on a number of segments the content items may be divided into based on the number of available content access points along the route. Additionally, the determination of the selectable routes may be based on the various sizes of each of those segments that may be sent and effectively transmitted to the mobile computing device based on duration of the connection between the mobile computing device and a particular content access point. The determination of selectable routes may also be based on the number of segments and/or size of one or more segments that may be sent to the mobile computing device via one or more content access points prior to the mobile vehicle 305 entering a gap in content access points so that the content items may still be played without interruption.

In some embodiments, for each possible route, the broadcast content provider may, using the fuzzy logic algorithm, predict when (e.g., at what predicted time) the mobile vehicle 305 will be within range of each of the content access points along a particular route. For example, the broadcast content provider may determine that the mobile vehicle 305 may be within range of a first content access point at 2:00 pm and have a connection for approximately 30 seconds with a transmission speed of 1 megabyte a second. Additionally, the broadcast content provider may determine that the mobile vehicle may be within range of a second content access point at 2:10 pm and may have a connection for approximately 10 seconds with a transmission speed of 500 megabytes per second. This information may also be used in determining the size of each segment and to account for distances between each content access point.

Once the selectable routes have been determined, the broadcast content provider, using the fuzzy logic algorithm, may determine one or more best or preferred selectable routes based that the most or best (e.g., has an amount of unused network storage above a predetermined value) available content access points along the route. The broadcast content provider may send to the mobile computing device within the mobile vehicle 305 the one or more selectable routes, an associated quality level (e.g., HD or SD resolution) for each of the selectable routes, an estimated travel time for that route (determined based on the fuzzy logic algorithm), and/or a route quality indication (e.g., better routes have more or better available content access points). For example, if two selectable routes are of equal distance or travel time, then the selectable route having more available content access points or content access points with less congestion may be recommended over the other selectable route.

The mobile computing device may display the selectable routes to the occupants, receive a selection from the occupant, and send an indication of the selected route and the associated quality level back to the broadcast content provider. The communications between the mobile computing device and the broadcast content provider may be through a content access point, a cellular signal, a satellite signal, and the like.

The broadcast content provider may determine the available content access points associated with the selected route. These available content access points may now be referred to as planned content access points.

Figure 4:
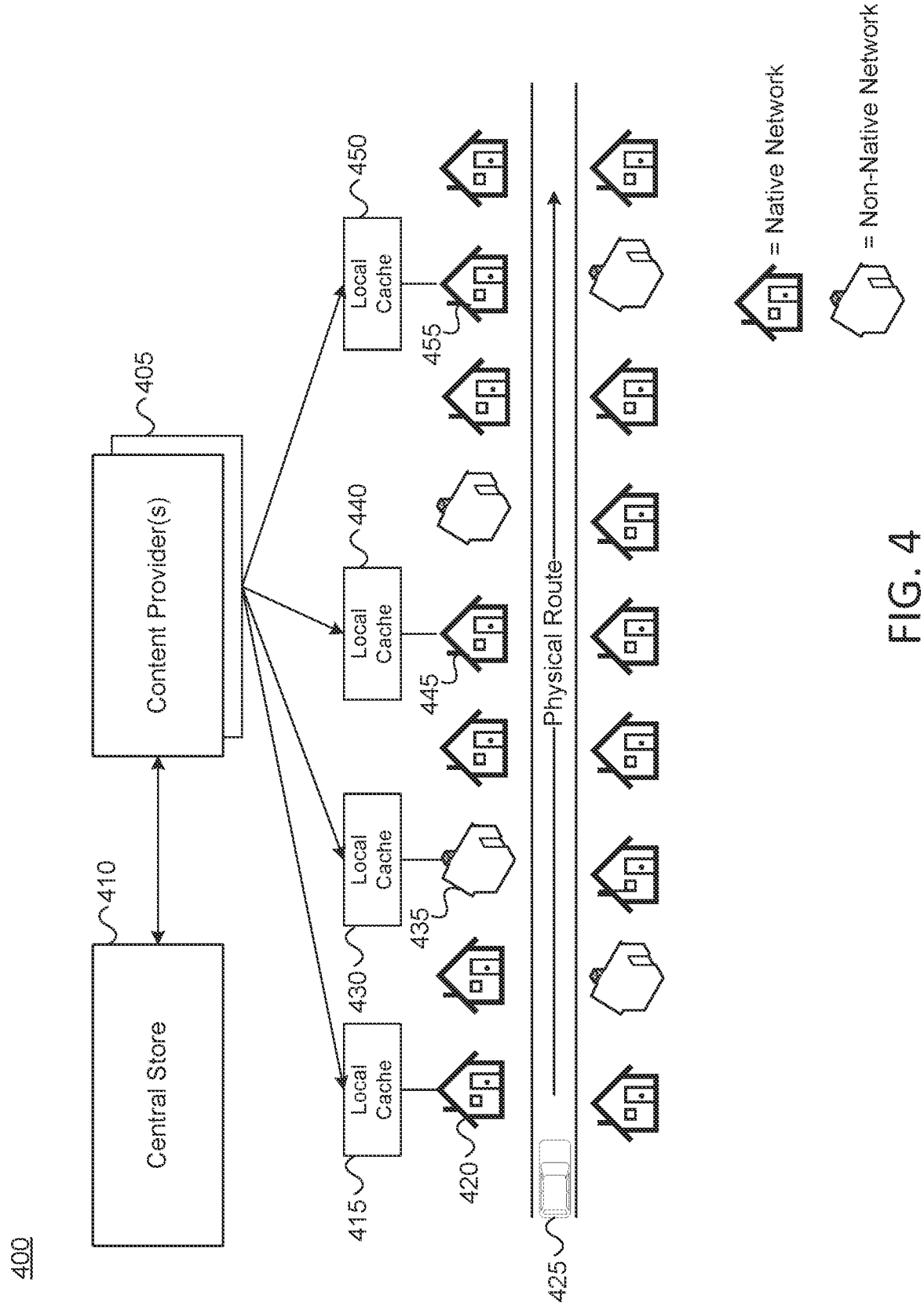
FIG. 4 illustrates an example of a system diagram for sending one or more segments of content items to a mobile vehicle that can be used to implement of any of the various features described herein.

FIG. 4 illustrates an example of a system diagram for sending one or more segments of content items to a mobile vehicle that can be used to implement of any of the various features described herein. The system 400 may include a mobile vehicle 425, one or more broadcast content providers 405, a central store 410, one or more planned content access points 420, 435, 445, 455 (e.g., a first planned content access point 420, a second planned content access point 435, a third planned content access point 445, and a fourth planned content access point 455). In an exemplary embodiment, the first and third planned content access points 420, 445 may be associated with a native network, and the second and fourth planned content access points 435, 455 may be associated with a non-native network.

The broadcast content provider 405 may retrieve the content items from the central store 410. For example, the broadcast content provider 405 may send a request for the content items to the central store 410 and, in response, may receive the content items from the contral store 410. The central store 410 may be associated with an entity different from the broadcast content provider 405. Alternatively, the central store 410 may be a part of the broadcast content provider. In some embodiments, the system 400 may include multiple central stores 410.

Once the broadcast content provider 405 has received the content items from the central store 410 and the selected route and quality level from a mobile computing device within the mobile vehicle 425, the broadcast content provider 405 may determine one or more analysis results for the selected route based on the fuzzy logic algorithm discussed above either by reanalyzing the selected route based on the fuzzy logic algorithm or by retrieving the results of the previous fuzzy logic analysis for the selected route from a memory of the broadcast content provider 405. For example, the broadcast content provider may determine the number of planned content access points 420, 435, 445, 455, there location, the distance between each adjacent planned content access points 420, 435, 445, 455 along the route, the status of the planned content access point 420, 435, 445, 455 (e.g., connection speed, signal strength, bandwidth, unused memory on the DVR). Additionally, the broadcast content provider 405 may predict when (e.g., at what predicted time) the mobile vehicle 425 will be within range of each of the planned content access points 420, 435, 445, 455 along the selected route.

The broadcast content provider 405 may determine how much of the content items can be transmitted through each planned content access point 420, 435, 445, 455 and may divide (e.g., break) the content into multiple segments based on the number of planned content access points 420, 435, 445, 455 along the selected route, a distance between two adjacent planned content access points 420, 435, 445, 455 along the route and multiple predicted location of the mobile vehicle 425 along the route at respective predicted times. The broadcast content provider 405 may associate each segment of the content items with a session initiation protocol (SIP).

Particularly, the broadcast content provider 405 may break the content items into one or more segments (e.g., blocks) of unequal and/or equal sizes. For example, a first segment may be of a size greater than a size of a second segment. For example, the size of the second segment may be equal to a size of a third segment. As noted above in FIG. 3, the size of the segment may depend on which planned content access point 420, 435, 445, 455 that the segment is to be assigned. For example, a particular planned content access point 420, 435, 445, 455 that has a strong signal (e.g., above a predetermined threshold), a fast connection speed (e.g., above a predetermined threshold), sufficient unused memory in the DVR, and is expected to be connected to mobile computing device for relatively longer period of time (e.g., longer than another planned content access point 420, 435, 445, 455 or above a predetermined threshold) may be assigned a larger segment than a planned content access points 420, 435, 445, 455 with a slower connection speed (e.g., below a predetermined threshold), comparably less unused memory in the DVR, and is expected to be connected to the mobile computing device for relatively shorter period of time (e.g., shorter than another planned content access point 420, 435, 445, 455 or below a predetermined threshold).

The broadcast content provider 405 may assign segments of an appropriate size for each particular planned content access point 420, 435, 445, 455 in chronological order and to planned content access points 420, 435, 445, 455 in the order the mobile vehicle will pass the planned content access points 420, 435, 445, 455. For example, the chronological first segment may be assigned to the first planned content access point 420 with which the mobile computing device will connect. The chronological second segment may be assigned to the second planned content access point 435 with which the mobile computing device will connect. The chronological third segment may be assigned to the third planned content access point 445 with which the mobile computing device will connect. The chronological fourth segment may be assigned to the fourth planned content access point 455 with which the mobile computing device will connect. While only 4 planned content access points are depicted, more or less planned content access points may be used. In such instances, the broadcast computing device may divide the content items into more or less than the 4 segments described herein.

The broadcast content provider may determine an expected delivery time to each planned content access point 420, 435, 445, 455. For example, the expected delivery time for a particular segment to a particular planned content access point may be the predicted time already calculated above of when (e.g., at an anticipated time) the mobile vehicle is expected to be within range of that particular planned content access point. In such instances, the broadcast content provider 405 may stream in real-time the segment through the planned content access point to the mobile computing device at the anticipated time or once a connection with the mobile computing device has been established. Additionally or alternatively, in some embodiments, the broadcast content provider 405 may send each segment at some time prior to the predicted time or at the predicted time. In such embodiments, the planned content access points 420, 440 on the native network may store the received segment in their local cache 415, 440 (e.g., a transmitter cache, an unused cache of a DVR, and the like). Similarly, the planned content access points 435, 455 on the non-native network may store the received segment in their local cache 430, 450 (e.g., a transmitter cache, an unused cache of a DVR, and the like). If the native network is slow between a particular local cache 415 and the planned content access point 420, the broadcast content provider 405 may send the segment to be stored at another cache of the planned content access point 420. Similarly, if the non-native network is slow between a particular local cache 430 and the planned content access point 435, the broadcast content provider 405 may send the segment to be stored at another cache of the planned content access point 435.

In some embodiments, the first planned content access point 420 may be the residence of the occupant of the mobile vehicle 425. In such embodiments, the broadcast content provider 405 may immediately send the first segment of the content items to the first planned content access point 420 for immediate transmission to the mobile computing device.

In some embodiments, the broadcast content provider 405 may send additional portions of segments to each planned content access point 420, 435, 445, 455 to account for variations in the speed of the mobile vehicle 425 (e.g., due to driving inconsistencies or traffic). For example, the broadcast content provider 405 may send at least a portion of segment assigned to a planned content access point to a geographically adjacent planned content access point. For example, the broadcast content provider 405 may send the first planned content access point 420 at least a portion of the second segment assigned to the second planned content access point 435. For example, the broadcast content provider 405 may send the second planned content access point 435 at least a portion of the first segment assigned to the first planned content access point 420. For example, the broadcast content provider 405 may send the third planned content access point 445 at least a portion of the second segment assigned to the second planned content access point 435. For example, the broadcast content provider 405 may send the second planned content access point 435 at least a portion of the third segment assigned to the third planned content access point 445. In some embodiments, the broadcast content provider 405 may vary the size of the additional portions of segments sent to another planned content access point based on the time of day. For example, during rush hour either larger segments or more segments may be sent to a particular planned content access point because the connection duration may be longer than anticipated and because the time the mobile vehicle 425 takes to get from one planned content access point to another may take longer than anticipated.

In some embodiments, the broadcast content provider 405 may minimize the amount duplicative portions of segments sent to other planned content access points to avoid overloading the network. For example, the broadcast content provider may prevent a duplicative segment already assigned to one planned content access point from being sent to another planned content access point.

In some embodiments, the broadcast content provider 405 may send the segment to two or more planned content access points 420, 435, 445, 455 simultaneously to ensure coverage. In some embodiments, the broadcast content provider 405 might not send the segment to all of the planned content access points or might not broadcast the segments to unplanned content access points.

In some embodiments, the broadcast content provider 405 may temporarily increase the bandwidth of a particular planned content access point when sending the particular planned content access point the one or more segments. As a result, the planned content access point might not have degradation in performance to the subscriber at the planned content access point. Additionally, increasing the bandwidth may permit an increase in the size of the segment transmitted or streamed through planned content access point to the mobile computing device. In some embodiments, increasing the bandwidth may permit greater distances between each planned content access point 420, 435, 445, 455.

The broadcast content provider 405 may send the mobile computing device within the mobile vehicle 425 one or more service set identifiers (SSIDs) that are respectively associated with the planned content access points 420, 435, 445, 455 along the selected route. The broadcast content provider 405 may send the SSIDs to the mobile computing device before the mobile computing device begins receiving at least some of the segments of the content items. The broadcast content provider may send each of the planned content access points 420, 435, 445, 455 their assigned SSID. In some embodiments, all of the planned content access points 420, 435, 445, 455 are assigned the same SSID. Additionally, the broadcast computing device may send each of the planned content access points 420, 435, 445, 455 a media access control (MAC) address of the mobile computing device that the broadcast content provider 405 either received from the mobile computing device and/or determined based on information of the occupant (e.g., subscriber) stored at the broadcast content provider 405. Because each planned content access point 420, 435, 445, 455 may have both the SSID and the MAC address of the mobile computing device and the mobile computing device may have both the SSID and its MAC address, the planned content access point may detect and establish a communication session with the mobile computing device. Similarly, the mobile computing device may detect and establish a communication session with each planned content access point 420, 435, 445, 455.

The mobile vehicle 425 may begin traversing the selected route based on the navigation instructions received in associated with the selected route. For example, the broadcast content provider 405 may send the mobile computing device within the mobile vehicle the navigation instructions based on the selected route. The navigation instructions may include real-time turn-by-turn directions through the route. The broadcast content provider 405 may update the directions based on the geographical location (e.g., a GPS location) of the mobile vehicle 425.

The mobile computing device may connect to a first planned content access point 420. For example, when the mobile vehicle 425 is within range of the first planned content access point 420 (e.g., within range of the WIFI hotspot), the mobile vehicle 425 and the first planned content access point 420 may establish a connection using the assigned SSID and the MAC address of the mobile computing device. The first planned content access point 420 may send the mobile computing device the first segment from its local cache 415.

The mobile computing device may begin playing the first segment of the content items (e.g., by displaying video or pictures and/or outputting audible signals) even if not all of the segments of the content items have been received. The mobile computing device may begin playing the first segment either automatically upon receipt of the first segment or after receipt of the first segment and upon receiving user input to begin playback. The mobile computing device may have selectable options to play, pause, stop, rewind, fast-forward, and other media player functions. The mobile computing may continue playback of the first segment even after the mobile computing device loses its connection with the first planned content access point 420 and before the mobile computing device establishes a connection with the second planned content access point 435. The first segment may be at least of sufficient size to permit continuous playback while the mobile vehicle 425 is in transit from the first planned content access point 420 to the second planned content access point 435. In some embodiments, the mobile computing device may receive at least a portion of the second, third, and/or another segment from the first planned content access point if the connection session between the mobile computing device and the first planned content access point 420 is of sufficient duration to transmit these portions and the mobile computing device has sufficient available memory to store these portions.

In some embodiments, the mobile computing device may have sufficient storage to store at least the segment. In alternative embodiments, the mobile computing device might not have sufficient storage to store the segment and the mobile computing device may only have sufficient storage buffer to reduce jitter and delay. In such instances, the planned content access points may have overlapping transmission ranges to ensure constant streaming to the segments of the content items.

Once the mobile computing device is within the range (e.g., WIFI hotspot) of the second planned content access point 435, the mobile computing device may connect with the second planned content access point 435 in any manner discussed herein. The second planned content access point 435 may send any portion of the first segment not yet received by the mobile computing device. Additionally, the second planned content access point 435 may send the mobile computing device the second segment from its local cache 430. If a connection time period is of sufficient duration, the second planned content access point 445 may send at least portion of the third, fourth, and/or another segment to the mobile computing device. The mobile computing device may automatically and seamlessly begin playing the second segment of the content items once the first segment of the content items has completed. For example, if one of the content items is a movie, then the mobile computing device may without interruption transition from playing the first segment of the movie to the second segment of the movie. As a result, the occupant may view the movie as if the movie had never been broken into segments. In other words, the movie may be played continuously. The second segment may be at least of sufficient size to permit continuous playback while the mobile vehicle 425 is in transit from the second planned content access point 435 to the third planned content access point 445.

Once the mobile computing device is within the range (e.g., WIFI hotspot) of the third planned content access point 445, the mobile computing device may connect with the third planned content access point 445 in any manner discussed herein. The third planned content access point 445 may send any portion of the first or second segments not yet received by the mobile computing device. Additionally, the third planned content access point 435 may send the mobile computing device the third segment from its local cache 440. If a connection time period is of sufficient duration, the third planned content access point 445 may send at least portion of the fourth and/or another segment to the mobile computing device. The mobile computing device may automatically and seamlessly begin playing the third segment of the content items once the second segment of the content items has completed. For example, if one of the content items is a movie, then the mobile computing device may without interruption transition from playing the second segment to the third segment. As a result, the occupant may view the movie as if the movie had never been broken into segments. In other words, the movie may be played continuously. The third segment may be at least of sufficient size to permit continuous playback while the mobile vehicle 425 is in transit from the third planned content access point 445 to the fourth planned content access point 455.

Once the mobile computing device is within the range (e.g., WIFI hotspot) of the fourth (e.g., a last or final) planned content access point 445, the mobile computing device may connect with the fourth planned content access point 455 in any manner discussed herein. The fourth planned content access point 455 may send any portion of the first, second, and/or third segments not yet received by the mobile computing device. Additionally, the fourth planned content access point 455 may send the mobile computing device the fourth (e.g., a last or final) segment from its local cache 450. The mobile computing device may automatically and seamlessly begin playing the fourth segment of the content items once the third segment of the content items has completed. In some embodiments, once the segment is sent to the mobile computing device, the respective planned content access point may delete the segment from its network cache.

In some embodiments, if more than one content item is selected (e.g., a movie and television show was selected by two different occupants), the segments may include a portion of the first content item multiplexed with a portion of the second content item. In some embodiments, one mobile computing device may receive the stream and may send the stream to the other mobile computing devices within the mobile vehicle 425. In other embodiments, each mobile computing device may receive a signal from the planned content access point to separately receive signals. Each of the content items may be in the same or different quality levels (e.g., resolutions). If during the route, the quality of content is switched (e.g., from a high definition resolution to a standard definition resolution), the occupants may be informed through their mobile computing devices.

In some embodiments, the broadcast content provider 405 may divide segments further into portions of segments and may distribute them to planned content access point have overlapping transmission ranges (e.g., when the throughput of a particular planned content access point is low, namely, below a predetermined threshold value). For example, the broadcast content provider may send a first portion of a segment to a particular planned content access point and send a second portion of the segment to another planned content access point. A transmission range (e.g., the WIFI hotspot's range) of the particular planned content access point may overlap at least a portion of a transmission range (e.g., the WIFI hotspot's range) of the other planned content access point.

In some embodiments, the broadcast content provider 405 may be a centralized system or a distributed system. For example, the broadcast content provider 405 may be one or more centralized routing computers or servers associated with particular geographic regions and the centralized routing computers may hand off management of the content item distribution to other centralized routing computers in other geographic regions along the route. Additionally, a centralized routing computer can be located on the internet or an intranet and routing data may be forwarded to that centralized routing computer from routing computers of other geographic regions. Once the routing information has been received, the centralized routing computer may allocate to different service providers (e.g., broadcast content providers) along the route an intersystem data negotiation layer protocol for streaming the content items to the mobile vehicle in an intersystem data distribution model. For example, there may be 10 different headend systems some of which are associated with a first broadcast content provider and some of which are associated with a second broadcast content provider. The intersystem data negotiation layer protocol permits the first broadcast content provider to stream to the mobile vehicle through content access points associated with the second broadcast content provider. The intersystem data negotiation layer protocol also permits the second broadcast content provider to insert data (e.g., an advertisement) into the stream of the first broadcast content provider. In other words, the second broadcast content provider may take hold of the stream sent by the first broadcast content provider and insert an advertisement at a particular time without degrading the stream.

Figure 5:
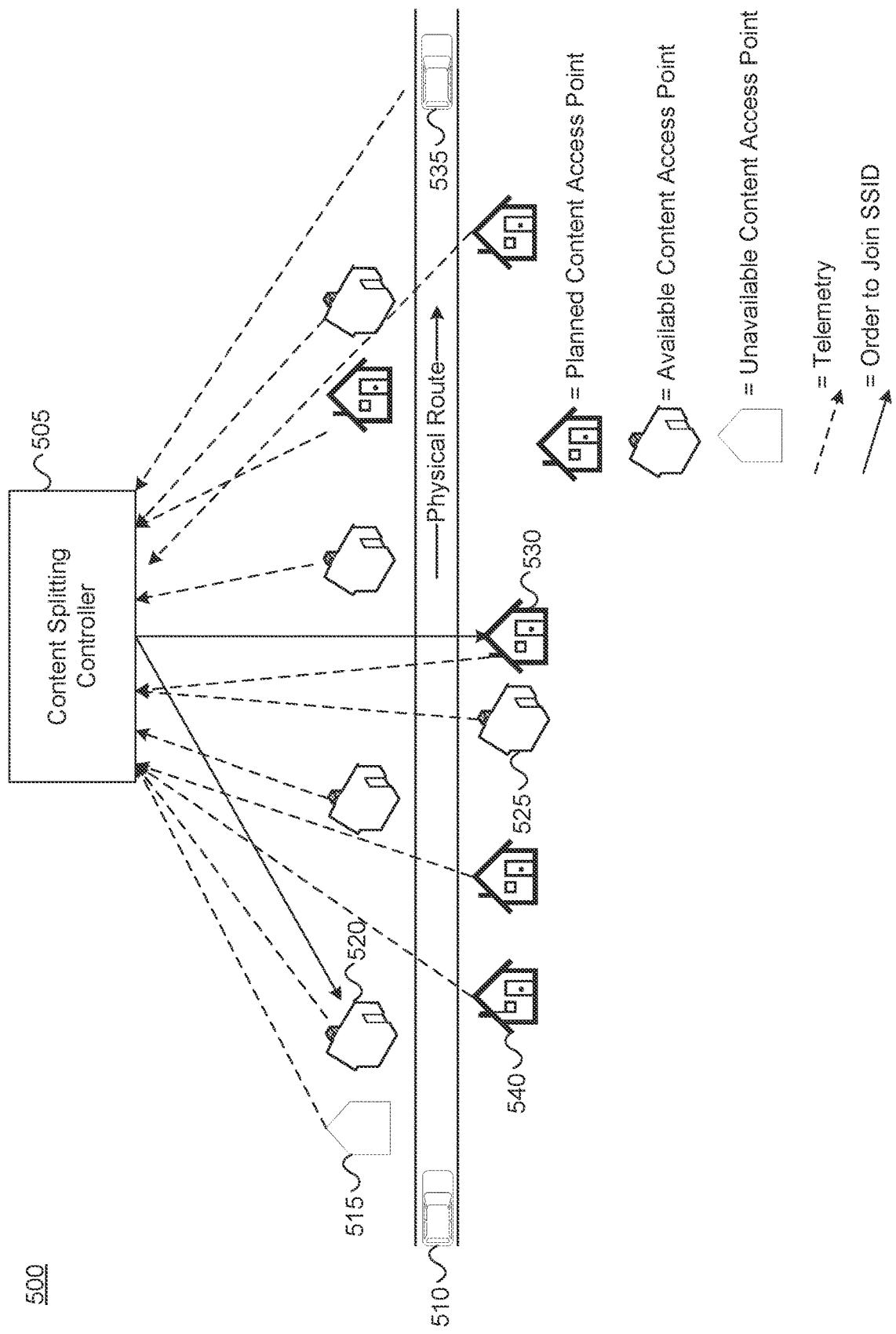
FIG. 5 illustrates an example of a system diagram for establishing connections and receiving information that can be used to implement of any of the various features described herein.

FIG. 5 illustrates an example of a system diagram for establishing connections and receiving telemetry that can be used to implement of any of the various features described herein. The system 500 may include a content splitting controller (e.g., a broadcast content provider) 505, an unavailable content access point 515, a first and second available content access points 520, 525, and a first and second planned content access points 540, 530. The system 500 may also include a first mobile vehicle 535 and a second mobile vehicle 510.

The second mobile vehicle 510 is continuously or alternatively intermittently searching for signals from content access points and may connect to content access points in accordance with a protocol (e.g., IEEE 802.11x). As the second mobile vehicle 510 approaches, a mobile computing device within the second mobile vehicle may detect a signal from the unavailable content access point 515, a signal from the available content access point 520 and a signal from the first planned content access point 540. The signal from the unavailable content access point 515 may be the strongest of the three signals detected and the signal of the first planned content access point may be the weakest of the three signals detected by the mobile computing device. Nonetheless, the mobile computing device may establish a connection with the first planned content access point 540 even when connecting using, for example, IEEE 802.11x. Typically, under the 802.11x standard, a device may first attempt to connect to the strongest signal prior to attempting to connect to a weaker signal. However, the mobile computing device may initially attempt to connect with the first planned content access point 540 using a received SSID. Because the mobile computing device is moving at a rate of speed, the initially detected weak signal of the first planned content access point 540 may become a strong signal within a predefined timeframe (e.g., within the next 4 seconds) as the second mobile vehicle 510 gets closer to and passes the first planned content access point 540. Additionally or alternatively, in some embodiments, although a particular signal may be strong (e.g., above a predetermined threshold), the mobile computing device might not connect to the associated contact access point because the network connection between that contact access point and a headend device is poor (e.g., below a predetermined threshold). In such embodiments, such a poor connection may inhibit the ability of the broadcast content provider to stream the segment of the content items to the mobile computing device through that content access point. Additionally or alternatively, in some embodiments, although a particular signal may be strong (e.g., above a predetermined threshold), the mobile computing device might not connect to the associated contact access point because that content access point is already overbooked and congested.

In other words, the content splitting controller 505 may send an instruction to the mobile computing device within the second mobile vehicle 510 to connect to a particular planned content access point according to the 802.11x standard irrespective of whether another content access point has a signal stronger than a signal of the particular planned content access point.

In some embodiments, in order to maximize the duration of a connection between a planned content access point and the second mobile vehicle 510 in transit, the connection may be established using a fast-connect no negotiation wireless protocol. Either the mobile computing device and/or the planned content access point may, based on the protocol, use the re-association request and response frames and a standard (e.g., the IEEE 802.11x standard) to establish a connection faster (e.g., in a time below a predetermined value) than a typical time to establish a connection using the standard. In other words, the re-association request and response frames inform the mobile computing device (e.g., the receiver within the mobile vehicle) when to 'hop' between planned content access points. Additionally, the content splitting controller 505 may instruct all of the planned content access points to use the same SSID (specific to a single session) and inform all of the planned content access points of the MAC address of the mobile computing device. The content splitting controller 505 may also inform the mobile computing device of the SSID for this single session for use in establishing connections with each of the planned content access points. Further, the mobile computing device might not need any formal handoff between planned content access points, might not need to authenticate each planned content access point, and might not need to negotiate with each planned content access point to establish a connection. As a result, the time taken to establish connections is minimized.

In some embodiments, the content splitting controller 505 may update the assignments of the segments to respective planned content access points based on the fuzzy logic algorithm. For example, either the content splitting controller 505 and/or the mobile computing device within the second mobile vehicle 510 may determine if the next planned content access point is available and whether the next planned content access point is the best (e.g., based on transmission speed, signal strength, signal congestion, and/or a location of second mobile vehicle 510). As a result, the second mobile vehicle 510 may connect to an alternative planned content access point to receive a segment assigned to another planned content access point. Additionally or alternatively, in some embodiments, the content splitting controller 505 may reassign a segment to a different planned content access point 530 and/or an available content access point 520 that is not currently a planned content access point. For example, if there is a problem with the connection between the mobile computing device within the second mobile vehicle 510 and the first planned content access point 540. The first segments initially assigned to the first planned content access point 540 may be reassigned and sent to either a different planned content access point 530 and/or an available content access point 520. In such instances, the content splitting controller may send, to either the different planned content access point 530 and/or the available content access point 520, an order to join an assigned SSID. The mobile computing device within the second mobile vehicle 510 prioritizes connections with content access points having that SSID and, thus, may connect with either the different planned content access point 530 and/or the available content access point 520.

In some embodiments, each content access point may send telemetry data back to the content splitting controller 505 so that the content splitting controller 505 may update or otherwise reassign segments of the content items. The content access point may send telemetry data even if that particular content access point did establish a communication session with the mobile computing device within the second mobile vehicle 510. For example, unavailable content access point 515 and available content access point might not connect with the mobile computing device but they may, nonetheless, send telemetry data of any detection of the mobile computing device to the content splitting controller 505. Planned content access points such as first planned content access point 540 may also send telemetry data to the content splitting controller 505. In some embodiments, a previous first mobile vehicle 535 to traverse the route may also send telemetry data to the content splitting controller 505.

The telemetry data may include, for example, the status of the content access point and/or the status of the second mobile vehicle 510. For example, the status of the content access point may include it's, for example, amount of unused network memory, congestion, bandwidth, speed, and signal strength as discussed in FIG. 10. The status of the second mobile vehicle may include it's, for example, approximate geographic location as discussed in FIG. 9. The content splitting controller 505 may reassign segments to other content access points based on a fuzzy logic algorithm analysis of the telemetry data. The first mobile vehicle 535 may provide a summary of its telemetry data for use with predicting the route and segments for the second mobile vehicle 510.

In some embodiments, the content splitting controller may set a signal strength threshold to a signal strength of the last content time marker received by the content splitting controller from a planned content access point. In some embodiments, the content splitting network may send a bye message to one or more of a planned content access point or a mobile computing device.

Figure 6:
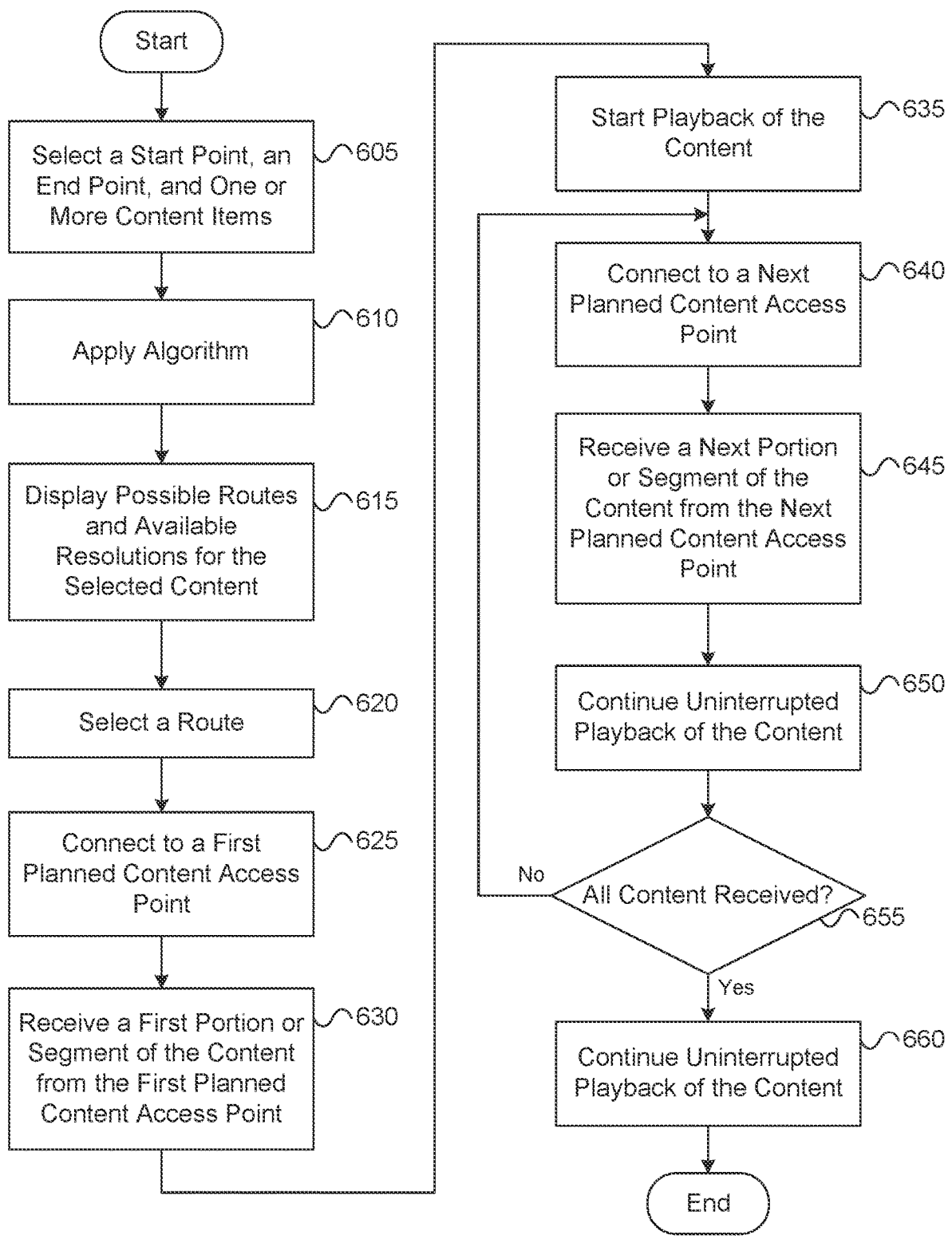
FIG. 6 illustrates a flowchart of an exemplary method in accordance with one or more illustrative aspects discussed herein.

FIG. 6 illustrates a flowchart of an exemplary method of selecting a route and content for playback at a mobile vehicle in accordance with one or more illustrative aspects discussed herein. In one or more embodiments, the method of FIG. 6 and/or one or more steps thereof may be performed by a computing device (e.g., computing device 200). In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin at step 605 in which a mobile computing device may receive a selection of a start point, an end point, and one or more content items. For example, in step 605, the mobile computing device may display start points, end points, and content items and, in response, may receive input selecting a particular start point (e.g., a starting location of the mobile vehicle), a particular end point (e.g., a destination location of the mobile vehicle), and one or more content items (e.g., one or more video and/or music files and/or other content files) by a user of the mobile computing device. In some embodiments, the start point may be automatically selected based on a global positioning system (GPS) of the mobile computing device. For example, the mobile computing device may automatically set as the start point as the current geographic location of the mobile computing device determined by the GPS. The mobile computing device may be a mobile vehicle navigation and/or entertainment system located within the mobile vehicle, a cellular phone, a tablet, a laptop, a computer, or another mobile computing device.

Additionally or alternatively, in some embodiments, multiple mobile computing devices within the mobile vehicle may be used in conjunction with the invention. In such embodiments, functionalities discussed herein may each be performed by any one of the mobile computing devices and/or may be distributed across the multiple mobile computing devices. For example, selections may be received by multiple mobile computing devices and may be sent to another mobile computing device. For example, a first mobile computing device (e.g., a vehicle navigation system) may receive start and end point selections while a second mobile computing device (e.g., a tablet) may receive one or more content item selections and a third computing device (e.g., a cellular phone) may receive one or more different content item selections. In such embodiments, the second and third mobile computing devices may send the respective content selections to the first mobile computing device or vice versa.

In step 610, an algorithm (e.g., a fuzzy logic algorithm) may be applied to the selections. For example, in step 610, the fuzzy logic algorithm may be performed locally by the mobile computing device. Additionally or alternatively, in some embodiments, a broadcast computing device associated with a broadcast content provider (e.g., a computing device associated with a headend) may execute the fuzzy logic algorithm and send the results (e.g., the possible routes) to the mobile computing device. In such embodiments, the mobile computing device may send the start point, end point, and content items to the broadcast computing device. The fuzzy logic algorithm may determine possible routes the mobile vehicle may traverse to receive segments of the selected content items to enable continuous uninterrupted playback of the content items by the mobile computing device. The possible routes may be specific to a particular resolution for the content items. For example, content items may be played in high-definition if a selected route has many content access points while the content items may be played in either standard definition or low definition if another route is selected that has fewer content access points.

An example of the algorithm may be any algorithm that may determine possible routes and resolutions for a selected content item to enable continuous playback of the content item along each route while accounting for one or more available physical routes, navigational options, content resolution, content duration, the characteristic of the physical routes, traffic conditions, locations of available access points, capacity of available access points, geographic gaps in coverage, handoffs to other providers, expected speed of the vehicle, or any other factor discussed herein. For example, the broadcast computing device may execute a fuzzy logic algorithm to determine the possible routes and resolution for the selected content items based on a number of factors. For example, the broadcast computing device may plot all available physical routes (e.g., roads, streets, etc.) between the start point and the end point. The broadcast computing device may apply navigational options such as, for example, avoiding highways, tolls, high occupancy vehicle lanes at particular times, or use a fastest route, and the like. The broadcast computing device may evaluate the content to be delivered including, for example, quality (e.g., a preferred resolution) and duration of the content. The broadcast computing device may evaluate the nature of each of the possible routes including, for example, the speed limit of each portion of the route, typical speed of a mobile vehicle along each portion of the route at a specific time of day, any actual real-time data regarding traffic conditions along the routes, and the duration of each route. The broadcast computing device may evaluate the presence and capacity of content access points (e.g., transmitters) along the route. For example, the broadcast computing device may evaluate the congestion, speed, and signal strength at each of the content access points along the route. The broadcast computing device may evaluate if there are geographic gaps in coverage where there is no or limited native coverage by the broadcast content provider. In such instances, the broadcast computing device may evaluate potential handoffs to a non-native network (e.g., a network of another broadcast service provider). The broadcast computing device may build advertising positions within the selected multiple content items. The broadcast computing device may account the number of available content access points and the distance between them. The broadcast computing device may account for duration the mobile computing device is expected to be connected to the content access point based on a predicted speed of the mobile vehicle as it passes the content access point.

In step 615, the mobile computing device may display to the user possible routes and available resolutions for the selected content items. For example, in step 615, the mobile computing device may receive the possible routes and available resolutions for the selected content items from the broadcast computing device of the broadcast content provider if the mobile computing device does not locally compute the routes and resolutions. In response, the mobile computing device may display the possible routes and available resolution for the selected content items. For example, high definition playback of the one or more content items may only be available on certain routes while standard definition or low definition playback of the one or more content items may only be available on certain other routes.

In step 620, a user may select a particular route to enable navigation of the mobile vehicle from the start point to the end point. For example, in step 620, the mobile computing device may receive a selection by the user of a particular route from the multiple possible routes. Because the particular route is associated with a particular quality level (e.g., resolution) of the selected content also displayed to the user, the selection of the particular route also selects a particular quality level (e.g., resolution such as a high definition resolution) for the previously selected content. In some embodiments, multiple quality levels (e.g., resolutions) may be available for a route. In such embodiments, after the user has selected the particular route, the user may additionally select one of the quality levels for the content items.

The mobile computing device may send an indication of the selected route and an indication of the selected content quality level to the broadcast computing device. In some embodiments, the mobile computing device may also send a media access control (MAC) address of the mobile computing device to the broadcast computing device. In response, the mobile computing device may receive from the broadcast computing device a list of the planned content access points along the route and a plurality of service set identifiers (SSIDs) that are associated with each respective planned content access point. The list may be ordered based on the order in which the mobile device will connect with each planned content access point along the route. The mobile computing device may connect with a planned content access point using its SSID.

The content access point may be a node on a wireless local area network (WLAN) (also referred to herein as a WIFI hotspot), a satellite network, a cellular network, and the like. In instances where some of the planned content access points are WIFI hotspots and others are on a different network, such as, for example, a satellite network, the mobile computing device may receive additional information to facilitate switching (e.g., handoffs) between them. In some embodiments, the planned content access points might not include a cellular network. For example, if the route goes through a desert, during that span of the route, the mobile computing device may connect with a satellite network.

A content access point may be a computing device (e.g., computing device 200) located at a premise of a subscriber of the broadcast content provider as discussed above in connection with FIGS. 1 and 2. For example, the content access point may be located at a consumer dwelling of the broadcast content provider. The content access point may include a receiver that may receive and process signals from a local office or headend of the broadcast content provider. The content access point may include a modem, a local WIFI router, and a gateway interface device, such as, for example, a set-top box, a digital video recorder, a digital transport adapter, a computer server, and the like. The content access point may create (e.g., by a wireless router or transmitter) a WLAN or WIFI hotspot so that other computing devices may wirelessly communicate with the content access point. Specifically, the content access point may send signals to the other computing devices and may receive signals from the other computing devices.

In step 625, the mobile computing device may connect to a first planned content access point. For example, in step 625, the mobile computing device may connect to a first planned content access point when the mobile vehicle comes within the range of a wireless transmitter of a first planned content access point. For example, the mobile computing device may negotiate a wireless connection with a router of the first planned content access point currently providing a WIFI hotspot.

In step 630, the mobile computing device may receive a first portion or segment of the selected content items from the first planned content access point. For example, in step 630, once the mobile computing device (e.g., a tablet), located within the moving mobile vehicle, connects with the WIFI hotspot of the first planned content access point, the mobile computing device may receive (e.g., download) and store (e.g., cache) a first segment of the selected content items from the first planned content access point. The first segment of the selected content items may be few megabytes to a few gigabytes in size. In an exemplary embodiment, the first segment of the selected content may be a first 10-minute segment of a 2-hour movie. In another exemplary embodiment, if there are multiple mobile computing devices within the mobile vehicle (e.g., a tablet and an car entertainment system), a first 5-minute segment of a TV show sent to the first mobile computing device and a first 5-minute segment of a movie sent to the second mobile computing device.

In step 635, the mobile computing device may start playback of the content. For example, in step 635, the mobile computing device (e.g., the tablet) may begin playing the first segment of the content even though not all of the segments of the content items have been received. For example, the mobile computing device may begin playing the first 10-minute segment of the movie received from the first planned content access point even though rest of the movie has not yet been received by the mobile computing device.

In step 640, the mobile computing device may connect to a next planned content access point. For example, in step 640, the mobile computing device may connect to the next planned content access point when the mobile vehicle comes within the range of a wireless transmitter of the next planned content access point. For example, the mobile computing device may negotiate a wireless connection with a router of the next planned content access point currently providing a WIFI hotspot.

In step 645, the mobile computing device may receive the next portion or segment of the selected content items from the next planned content access point. For example, in step 645, once the mobile computing device (e.g., a tablet), located within the moving mobile vehicle, connects with the WIFI hotspot of the next planned content access point, the mobile computing device may receive (e.g., download) and store (e.g., cache) a next segment of the selected content items from the next planned content access point. The next segment of the selected content items may be few megabytes to a few gigabytes in size. In an exemplary embodiment, the next segment of the selected content may be the next 20-minute segment of a 2-hour movie. In another exemplary embodiment, if there are multiple mobile computing devices within the mobile vehicle (e.g., a tablet and an car entertainment system), the next segment of the selected content may be the next 10-minute segment of a TV show sent to the first mobile computing device and the next 10-minute segment of a movie sent to the second mobile computing device.

In step 650, the mobile computing device may continue uninterrupted playback of the content items. For example, in step 650, the mobile computing device may automatically play the next segment once the mobile computing device has finished playing the previous segment (e.g., the first segment). As a result, the mobile computing device may play each segment of the content items without interruption. In an exemplary embodiment, the mobile computing device may automatically play the next 20-minute segment of a movie after the mobile computing device finishes playing the previous (e.g., first) 10-minute segment of the movie without interruption. Thus, the movie will appear continuous to a viewer of the content items. The mobile computing device may play the next segment even though not all of the segments of the content items have been received.

In step 655, the mobile computing device may determine whether all of the content items have been received by the mobile computing device. For example, in step 655, the mobile computing device may determine whether all of the segments of the content items (e.g., all of the segments of the movie) have been received by the mobile computing device. If not all of the segments of the content items have been received, steps 640-650 may be repeated. For example, the mobile computing device may connect to a next planned content access point, receive a next segment from that next planned content access point, and continue uninterrupted playback of the content items. If all of the segments of the content items have been received by the mobile computing device (e.g., if all of the segments of the movie have been received), the method may continue to step 660.

In step 660, the mobile computing device may continue uninterrupted playback of the content items. For example, in step 660, the mobile computing device may continue playing each section in the order received until the mobile computing device has played all of the segments of the content items. For example, the mobile computing device may continuously play all segments of the movie without interruption until the movie ends. Thus, the movie will appear to a viewer to have continuously played from start to finish.

Figure 7:
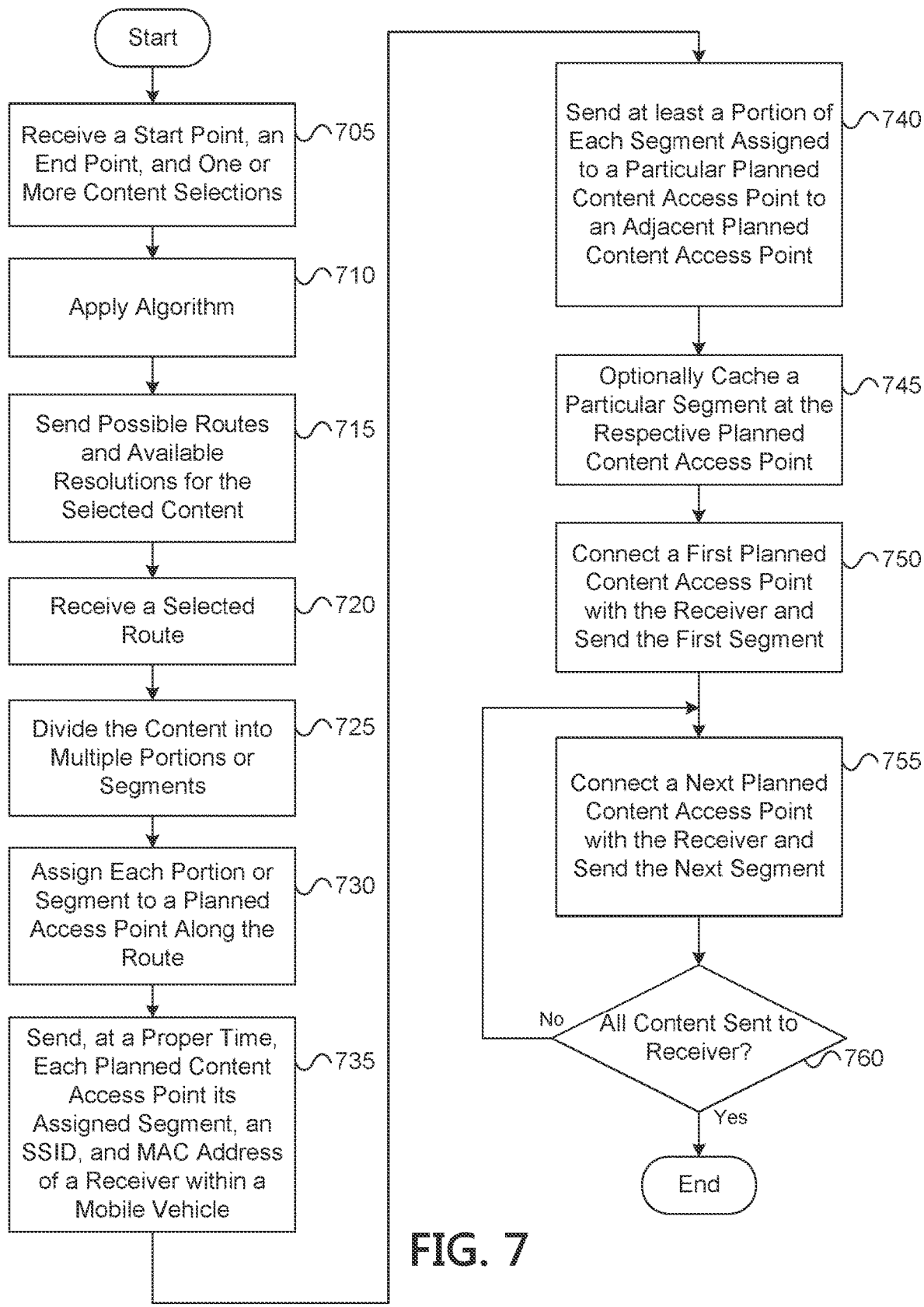
FIG. 7 illustrates a flowchart of an exemplary method in accordance with one or more illustrative aspects discussed herein.

FIG. 7 illustrates a flowchart of an exemplary method of providing selected content to a mobile vehicle along a route in accordance with one or more illustrative aspects discussed herein. In one or more embodiments, the method of FIG. 7 and/or one or more steps thereof may be performed by a computing device (e.g., computing device 200). In other embodiments, the method illustrated in FIG. 7 and/or one or more steps thereof may be embodied in computer-executable instructions that are stored in a computer-readable medium, such as a non-transitory computer-readable memory.

As seen in FIG. 7, the method may begin at step 705 in which a broadcast computing device may receive a start point, an end point, and one or more content items. For example, in step 705, the broadcast computing device may receive from the mobile computing device the start point, end point, and one or more content items. In some embodiments, the start point may be automatically selected based on the GPS of the mobile computing device.

In step 710, an algorithm (e.g., a fuzzy logic algorithm) may be applied to the selections. For example, in step 710, the fuzzy logic algorithm may be performed locally by the mobile computing device. Additionally or alternatively, in some embodiments, the broadcast computing device may execute the fuzzy logic algorithm. The fuzzy logic algorithm may determine possible routes the mobile vehicle may traverse to receive segments of the selected content items to enable continuous uninterrupted playback of the content items by the mobile computing device. The possible routes may be specific to a particular resolution for the content items. For example, content items may be played in high-definition if a selected route has many content access points while the content items may be played in either standard definition or low definition if another route is selected that has fewer content access points.

An example of the algorithm may be any algorithm that may determine possible routes and resolutions for a selected content item to enable continuous playback of the content item along each route while accounting for one or more available physical routes, navigational options, content resolution, content duration, the characteristic of the physical routes, traffic conditions, locations of available access points, capacity of available access points, geographic gaps in coverage, handoffs to other providers, expected speed of the vehicle, or any other factor discussed herein. For example, the broadcast computing device may plot all available physical routes (e.g., roads, streets, etc.) between the start point and the end point. The broadcast computing device may apply navigational options such as, for example, avoiding highways, tolls, high occupancy vehicle lanes at particular times, or use fastest route, and the like. The broadcast computing device may evaluate the content to be delivered including, for example, quality (e.g., a preferred resolution) and duration of the content. The broadcast computing device may evaluate the nature of each of the possible routes including, for example, the speed limit of each portion of the route, typical speed of a mobile vehicle along each portion of the route at a specific time of day, any actual real-time data regarding traffic conditions along the routes, and the duration of each route. The broadcast computing device may evaluate the presence and capacity of content access points (e.g., transmitters) along the route. For example, the broadcast computing device may evaluate the congestion, speed, and signal strength at each of the content access points along the route. The broadcast computing device may evaluate if there are geographic gaps in coverage where there is no or limited native coverage by the broadcast content provider. In such instances, the broadcast computing device may evaluate potential handoffs to a non-native network (e.g., a network of another broadcast service provider). The broadcast computing device may build advertising positions within the selected multiple content items. The broadcast computing device may account the number of available content access points and the distance between them. The broadcast computing device may account for duration the mobile computing device is expected to be connected to the content access point based on a predicted speed of the mobile vehicle as it passes the content access point.

In step 715, the broadcast computing device may send the possible routes and the available quality level of the content (e.g., the available resolutions) to the mobile computing device.

In step 720, the broadcast computing device may receive a selected route. For example, in step 720, the broadcast computing device may receive from the mobile computing device the route selected by the user to navigate from the start point to the end point. The selection of the route may be associated with a particular quality level (e.g., resolution) for the content items. In some embodiments, the broadcast computing device may receive a separate indication of the quality level for the content from the mobile computing device.

In step 725, the broadcast computing device may divide the one or more selected content items into multiple portions or segments. For example, in step 725, the broadcast may divide a first content item (e.g., a movie) into multiple segments as well as divide a second content item (e.g., a television show) into multiple segments. The size of each segment and the location to which each segment is sent may be based on the fuzzy logic algorithm discussed above. For example, the size of one or more segments may be different from the size of one or more other segments. The size of a particular segment of the content items may be based on the available bandwidth at a planned content access point, the distance between planned content access points, the amount of available storage at a planned content access point, the expected duration of the wireless connection between a planned content access point and the mobile computing device (which may be determined based on an anticipated speed of mobile vehicle as it passes the planned content access point), and/or any other factor discussed herein in connection with the fuzzy logic algorithm.

In step 730, the broadcast computing device may assign each portion or segment to a respective planned content access point along the selected route. For example, in step 730, the broadcast computing device may select a subset of one or more available content access points along the route to be the planned content access points. The planned content access points may be selected based on the fuzzy logic algorithm and any factor associated therewith. Further, the broadcast computing device may assign the segments in chronological order to the respective planned content access points based on an order in which the each planned content access point will be traversed (e.g., passed and/or connected to) by the mobile computing device within the mobile vehicle as the mobile vehicle moves along the selected route. In an exemplary embodiment, the broadband computing device may assign a first or beginning segment of a content item (e.g., a movie) to a first planned content access point. In some embodiments, the first planned content access point may be the residence of the owner of the mobile vehicle. In other embodiments, the first planned content access point may be any available content access point near the mobile vehicle. The broadcast computing device may assign a second segment (e.g., the chronologically second segment of the movie) to the next planned content access point (e.g., a second planned content access point) that the mobile vehicle will encounter as it travels along the route. The broadcast computing device may assign a third segment (e.g., the chronologically third segment of the movie) to the next planned content access point (e.g., a third planned content access point) that the mobile vehicle will encounter as it travels along the route, and so on.

In step 735, the broadcast computing device may send, at a proper time, each planned content access point its assigned segment, an SSID, and a MAC address of a receiver (e.g., the mobile computing device) within the mobile vehicle. For example, in step 735, the broadcast computing device may send an SSID that a particular planned content access point is to use when connecting with the mobile computing device. The broadcast computing device may send to each planned content access point the MAC address of the mobile computing device so that the planned content access point may identify the mobile computing device. Additionally, the broadcast computing device may send the assigned segment to the planned content access point. For example, the broadcast computing device may send the first segment of the movie to the first planned content access point. The SSID, MAC address, and the segment may be sent to together, separately or any combination thereof.

In step 740, the broadcast computing device may optionally send at least a portion of each segment assigned to a particular planned content access point to an adjacent planned content access point. For example, in step 740, the broadcast computing device may send a particular segment to an assigned planned content access point as discussed above and may also send the particular segment (or a portion thereof) to the planned content access point that the mobile vehicle will come in contact with immediately before the particular planned content access point and/or immediately after the particular planned content access point. By sending the particular segment assigned to a planned content access point to planned content access points geographically adjacent to the planned content point, the mobile computing device will continue to receive segments in time to permit continuous uninterrupted playback even if there is an error in the fuzzy logic algorithm's predictions.

In step 745, in response to receiving the assigned segment, the planned content access point may optionally cache the assigned segment. For example, in step 745, the planned content access point may store the assigned segment in a network memory associated with the planned content access point. For example, a DVR of the planned content access point may store the segment in unused memory of the DVR (i.e., memory not in use by a subscriber or customer located at the planned content access point). In some embodiment, the planned content access point may store the segment when the segment is received prior to establishing a connection with the mobile computing device. Additionally or alternatively, in some embodiments, the planned content access point might not store the segment when, for example, the segment is to be streamed to the mobile computing device as discussed in FIG. 8 below.

In step 750, the planned content access point along the route may connect with a receiver (e.g., the mobile computing device) of the mobile vehicle and send its assigned (and optionally stored) segment to the mobile computing device. For example, in step 750, the planned content access point may receive a signal from the mobile computing device that includes the MAC address of the mobile computing device and an SSID. The planned content access point may compare the MAC address and SSID received from the mobile computing device with the MAC address and SSID received from the broadcast computing device. If there two MAC addresses match and if the two SSIDs match, the planned content access point may setup (e.g., establish) a communication session with the mobile computing device. Once the communication session is setup, the planned content access point may send the assigned (and optionally stored) segment from the planned content access point to the mobile computing device within the moving mobile vehicle.

In step 755, a next planned content access point along the route may connect with the receiver (e.g., the mobile computing device) of the mobile vehicle and send its assigned (and optionally stored) segment to the mobile computing device. For example, in step 755, the next planned content access point may receive a signal from the mobile computing device that includes the MAC address of the mobile computing device and an SSID. The next planned content access point may compare the MAC address and SSID received from the mobile computing device with the MAC address and SSID received from the broadcast computing device. If there two MAC addresses match and if the two SSIDs match, the next planned content access point may setup (e.g., establish) a communication session with the mobile computing device. Once the communication session is setup, the next planned content access point may send the assigned (and optionally stored) next segment from the planned content access point to the mobile computing device within the moving mobile vehicle.

In step 760, in response to a determination that not all of the segments have been sent to the receiver (e.g., the mobile computing device), steps 755 and 760 may be repeated until all segments of the content have been sent to the receiver. The determination may be made by one or more of the mobile computing device, the broadcast computing device, and/or a planned content access point.

Figure 8:
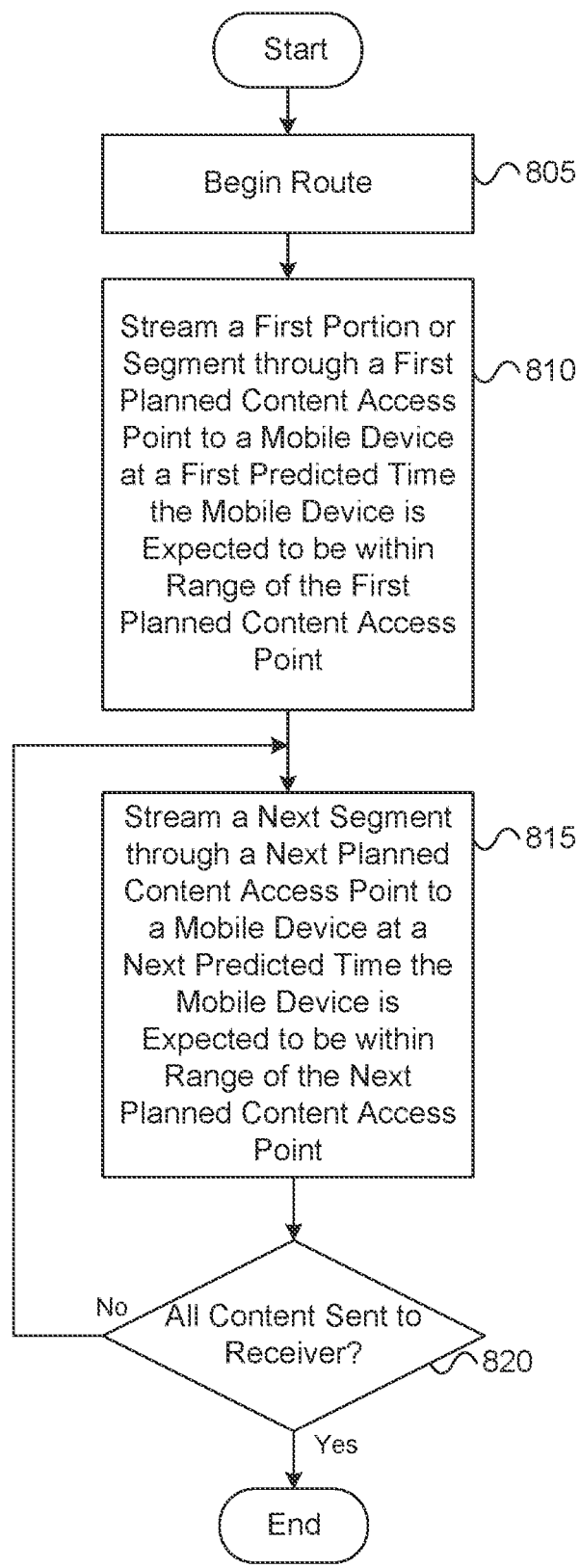
FIG. 8 illustrates a flowchart of an exemplary method in accordance with one or more illustrative aspects discussed herein.

FIG. 8 illustrates a flowchart of an exemplary method of streaming content to a mobile vehicle along a route in accordance with one or more illustrative aspects discussed herein. In one or more embodiments, the method of FIG. 8 and/or one or more steps thereof may be performed by a computing device (e.g., computing device 200). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which the mobile vehicle may begin its selected route. For example, in step 805, a broadcast computing device may perform or otherwise execute any of steps 705-735 discussed above. In this embodiment, the broadcast computing device may stream (e.g., send) each segment assigned to a respective planned content access point to the respective planned content access point at a predetermined predicted time the mobile vehicle is expected to be within range of that particular planned content access point. Because the mobile computing device is expected to be within range of the planned content access point, the planned content access point may receive the stream of the segment from the broadcast computing device and may send the stream to the mobile computing device. Additionally or alternatively, in some embodiments, the broadcast computing device may stream the segment to the planned content access point after the planned content access point has established a connection with the mobile computing device and sent an indication of the connection to the broadcast computing device. In some embodiments, the planned content access point might not cache or otherwise store the segment at the planned content access point. In other embodiments, the planned content access point may cache the segment in network storage associated with the planned content access point.

In step 810, the broadcast computing device may stream a first segment through a first planned content access point to the mobile device (e.g., in the mobile vehicle) at a first predicted time the mobile vehicle is expected to be within range of the first planned content access point. For example, in step 810, the broadcast computing device may stream the first segment of a movie, through the first planned content access point, to the mobile computing device within the moving vehicle when the moving vehicle is expected to be passing the first planned content access point.

In step 815, the broadcast computing device may stream a next segment through a next planned content access point to the mobile vehicle at a next predicted time the mobile vehicle is expected to be within range of the next planned content access point. For example, in step 815, the broadcast computing device may stream the next segment of the movie, through the next planned content access point, to the mobile computing device within the moving vehicle when the moving vehicle is expected to be passing the next planned content access point.

In step 820, in response to a determination that not all of the segments have been sent to the receiver (e.g., the mobile computing device), steps 815 and 820 may be repeated until all segments of the content have been sent to the receiver. The determination may be made by one or more of the mobile computing device, the broadcast computing device, and a planned content access point.

Figure 9:
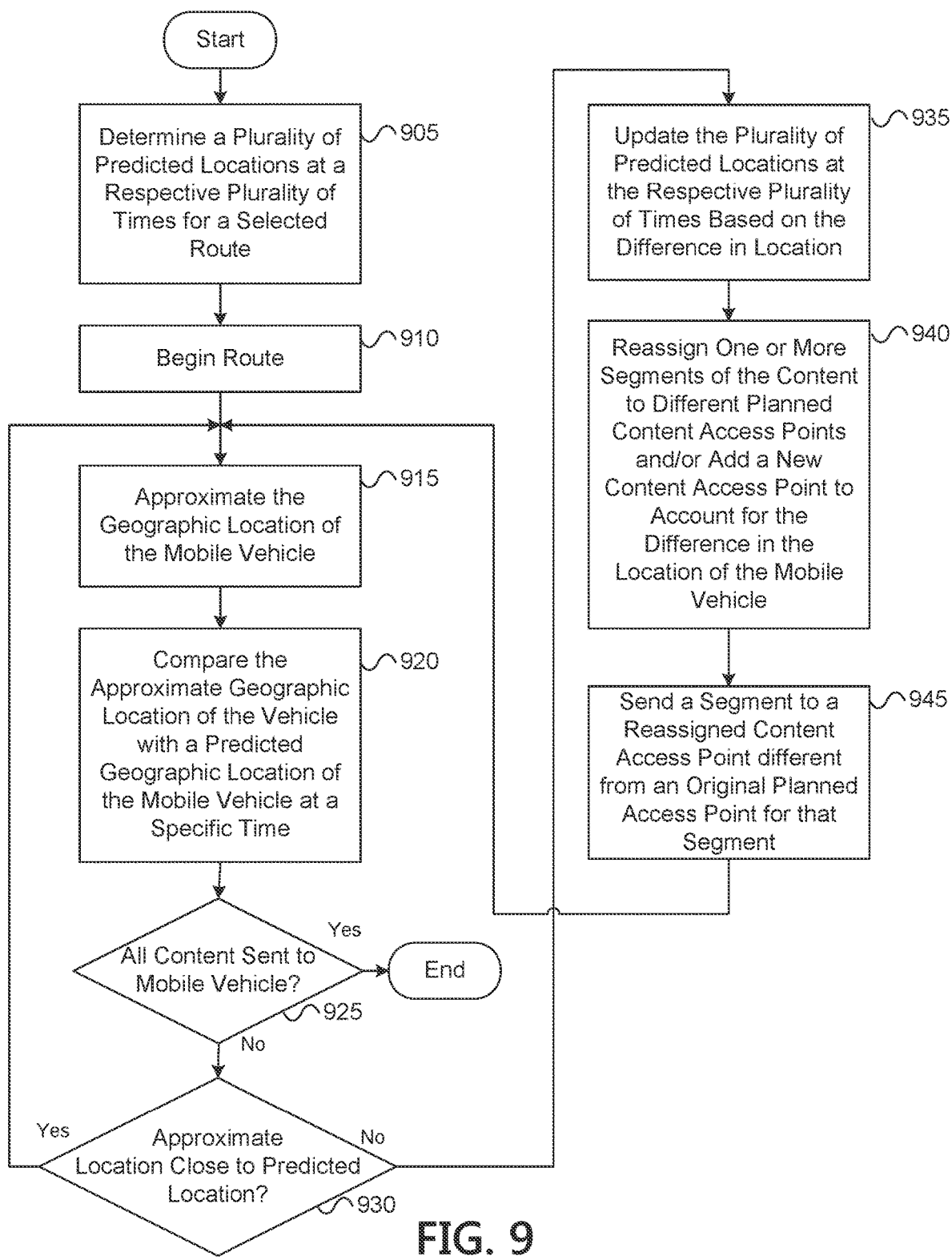
FIG. 9 illustrates a flowchart of an exemplary method in accordance with one or more illustrative aspects discussed herein.

FIG. 9 illustrates a flowchart of an exemplary method of reassigning segments to provide selected content to a mobile vehicle along a route based on a geographic location of the mobile vehicle in accordance with one or more illustrative aspects discussed herein. In one or more embodiments, the method of FIG. 9 and/or one or more steps thereof may be performed by a computing device (e.g., computing device 200). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin at step 905 in which a broadcast computing device may determine a plurality of predicted locations (e.g., planned content access points) for the mobile vehicle at a respective plurality of times for a selected route. For example, in step 905, the broadcast computing device may predict an anticipated time when the mobile vehicle is expected be within range of a planned content access point based on the fuzzy logic algorithm discussed above. For example, the broadcast computing device may predict the anticipated time based on, for example, a speed limit, real-time traffic conditions, expected traffic conditions for the time of day, intermediary stops by the mobile vehicle (e.g., the mobile vehicle may stop at the dry cleaners so the occupant(s) may drop off their laundry), and the like. In some embodiments, the broadcast computing device may also perform or otherwise execute any of the steps of FIG. 7 discussed above, such as, for example, steps 705 and 710.

In step 910, the mobile vehicle may begin a selected route. For example, in step 910, the mobile vehicle may begin connecting to the planned content access points and retrieving segments from each planned content access point in accordance with any of Figures discussed herein.

In step 915, one or more of the computing devices may approximate the geographic location (e.g., telemetry) of the mobile vehicle. For example, the mobile computing device may send its GPS location to a planned content access point if the mobile computing device has GPS functionality. The planned content access point may then transmit the GPS location and optionally the time to the broadcast computing device. Additionally or alternatively, the planned content access point may transmit an indication that it has connected with the mobile computing device. In other words, when the mobile computing device registers with a planned content access point, the planned content access point may send an indication of the registration to the broadcast computing device. Because the location of the planned contact access point (e.g., the address of a subscriber), the direction of the mobile vehicle, an approximate speed of the mobile vehicle and the route are all known, the broadcast computing device may approximate the geographic location of the mobile vehicle. Additionally or alternatively, in some embodiments, the broadcast computing device may receive from cell phone companies the location data of the cell phones of the occupants of the mobile vehicle because the cell phones are likely on their person.

In step 920, the broadcast computing device may compare the approximate geographic location of the mobile vehicle with a predicted geographic location of the mobile vehicle for the specific time. For example, in step 920, the broadcast computing device may receive or locally determine the approximate geographic location of the mobile vehicle associated with a specific time and, in response, may look up the predicted geographic location of the mobile vehicle for the specific time. The broadcast computing device may then compare the approximate geographic location with the predicted geographic location.

In step 925, the broadcast computing device may determine if all of the segments of the content items have been sent to the mobile computing device within the mobile vehicle. If all of the segments have been sent to the mobile computing device, then the method may end. If not all of the segments have been sent to the mobile computing device, the method may continue to step 930.

In step 930, the broadcast computing device may determine whether the approximate geographic location is close (e.g., within a predefined geographic range) to the predicted location for the specific time. For example, after comparing the approximate geographic location with the predicted location, the broadcast computing device may determine the difference between the two aforementioned geographic locations. If the difference between the approximate geographic location and the predicted location is within an acceptable predefined range, the method may repeat steps 915-930. If the difference between the approximate geographic location and the predicted location is not within (i.e., outside of) the acceptable predefined range, the method may continue to step 935.

In step 935, the broadcast computing device may update the plurality of predicted locations at the respective plurality of predicted times to account for the difference in location of the mobile vehicle. For example, in step 935, the broadcast computing device may, based on the received and/or locally determined approximate location of the mobile vehicle, calculate a new set of predicted locations for specific predicted times using the fuzzy logic algorithm.

In step 940, the broadcast computing device may reassign one or more segments of the content to different planned content access points and/or to new content access points to account for the difference in location of the mobile vehicle. For example, in step 940, the broadcast computing device may reassign one or more segments (or portions) from one or more planned content access points to one or more other planned content access points and/or one or more available (and unplanned) content access points along the route. For example, if the mobile vehicle is traversing the route slower speed than predicted, the broadcast computing device may reassign portions of segments to content access points that the mobile vehicle will pass earlier in the route than the previously assigned planned content access points. Similarly, if the mobile vehicle is traversing the route at a faster speed than predicted, the broadcast computing device may reassign portions of segments to content access points that the mobile vehicle will pass later in the route than the previously assigned planned content access point. In an instance where at least a portion of a segment is assigned to a new available content access point that was not previously assigned any segments, the new available content access point may now be considered a planned content access point. The content access point to which a segment (or portion thereof) is being reassigned may be considered a newly assigned planned content access point and/or simply referred to as a planned content access point. In some embodiments, the broadcast computing device may send the newly assigned planned computing device an order to join a particular SSID to facilitate connection between the mobile computing device and the newly assigned planned content access point. The particular SSID may be an SSID previously sent to the mobile computing device. In some embodiments, the particular SSID might not have been previously sent to the mobile computing device. In such embodiments, the broadcast computing device may send the particular SSID to a planned content access point and the planned content access point may send the particular SSID to the mobile computing device.

In step 945, the broadcast computing device may send each of the reassigned segments (or portions thereof) to the newly assigned planned content access point. For example, in step 945, the broadcast computing device may send the segment to the newly assigned planned content access point prior to the mobile vehicle coming within range of the newly assigned planned content access point. In such an instance, the newly assigned content access point may cache the received segment or portion of the segment in its associated unused network memory. Additionally or alternatively, the broadcast computing device may stream at least a portion of the segments through the newly assigned planned content access point to the mobile computing device within the mobile vehicle when the mobile vehicle is within range of the newly planned content access point (i.e., when the mobile computing device has connected with the newly assigned planned content access point). Once step 945 has been completed, steps 915-925 (and potentially steps 930-945) may be repeated until all content has been sent to the mobile vehicle.

Figure 10:
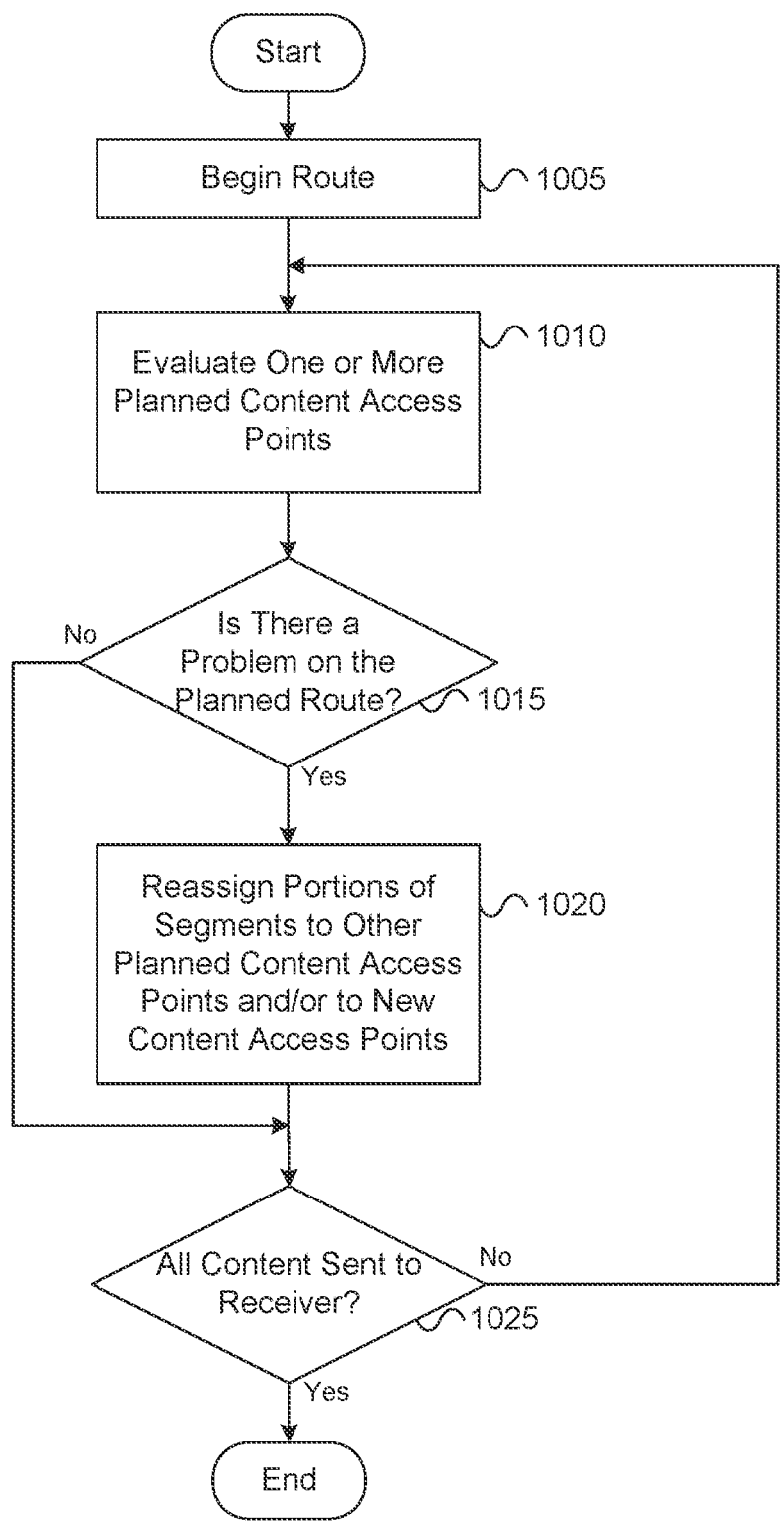
FIG. 10 illustrates a flowchart of an exemplary method in accordance with one or more illustrative aspects discussed herein.

FIG. 10 illustrates a flowchart of an exemplary method of reassigning segments to provide selected content to a mobile vehicle along a route based on a status of planned content access points in accordance with one or more illustrative aspects discussed herein. In one or more embodiments, the method of FIG. 10 and/or one or more steps thereof may be performed by a computing device (e.g., computing device 200). In other embodiments, the method illustrated in FIG. 10 and/or one or more steps thereof may be embodied in computer-executable instructions that are stored in a computer-readable medium, such as a non-transitory computer-readable memory.

As seen in FIG. 10, the method may begin at step 1005 in which a mobile device may begin a route and may begin to receive segments of content from planned content access points as discussed herein.

In step 1010, the broadcast computing device may evaluate one or more planned content access points. For example, in step 1010, the broadcast computing device may receive status data from one or more planned content access points. The status data may include, for example, network speed, signal strength, provisioned data, unused available network storage at the planned content access point, whether the planned content access point is overbooked, telemetry, any data from previous communication sessions, whether a transmitter of the planned content access point is down, and the like.

In step 1015, the broadcast computing device may determine if there is a problem on the planned route. For example, in step 1015, based on the received status data, the broadcast computing device may determine if there is a problem with a planned content access point. For example, the problem may be that planned content access points has one or more of a slow network connection, weak signal strength, insufficient available network storage, it has been overbooked, its transmitter is down, and the like. If the broadcast computing device determines that there is not a problem on the planned route, the method may proceed to step 1025. If the broadcast computing device determines that there may be a problem on the planned route, the method may proceed to step 1020.

In step 1020, the broadcast computing device may reassign at least one or more portions of one or more segments to other planned content access points and/or to new available content access points. For example, in an instance where there is traffic congestion at the planned content access point, the broadcasting computing device may send a portion of the segment to a neighboring available content access point to increase the throughput. For example, in step 1020, the broadcast computing device may reassign and send segments to newly assigned content access points as discussed above in FIG. 9.

In step 1025, in response to a determination that not all of the segments have been sent to the receiver (e.g., the mobile computing device), steps 1010-1025 may be repeated until all segments of the content have been sent to the receiver. The determination may be made by one or more of the mobile computing device, the broadcast computing device, and a planned content access point.

Figure 11:
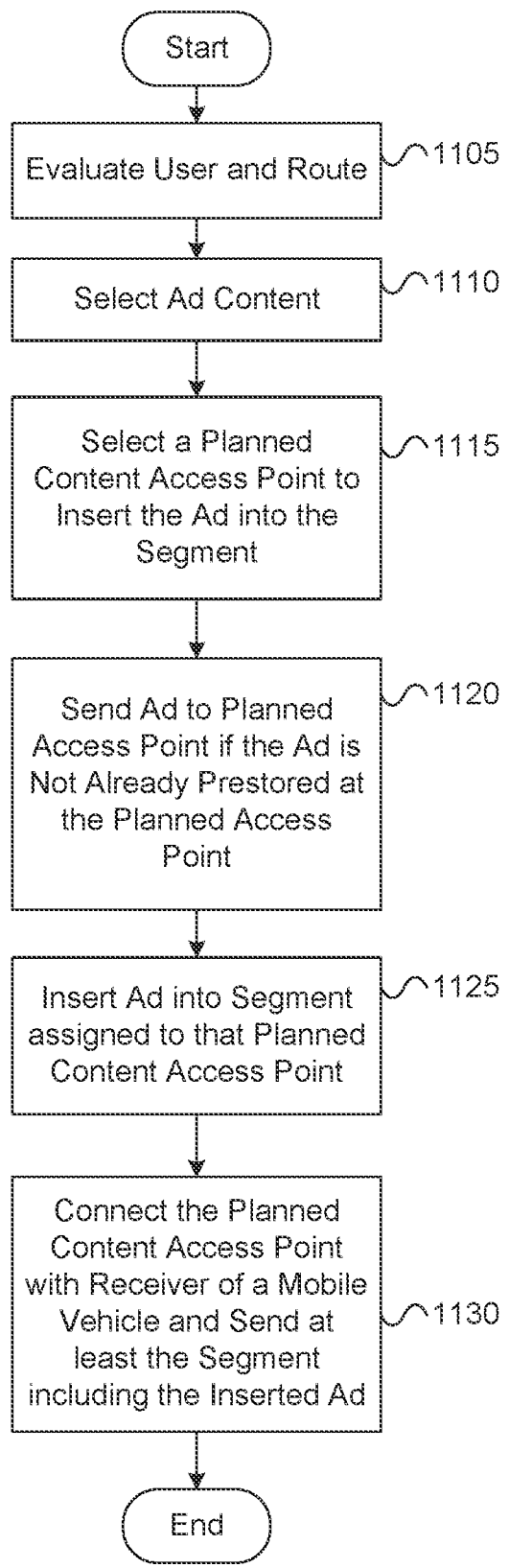
FIG. 11 illustrates a flowchart of an exemplary method in accordance with one or more illustrative aspects discussed herein.

FIG. 11 illustrates a flowchart of an exemplary method of providing advertisements within the selected content sent to a mobile vehicle along a route in accordance with one or more illustrative aspects discussed herein. In one or more embodiments, the method of FIG. 11 and/or one or more steps thereof may be performed by a computing device (e.g., computing device 200). In other embodiments, the method illustrated in FIG. 11 and/or one or more steps thereof may be embodied in computer-executable instructions that are stored in a computer-readable medium, such as a non-transitory computer-readable memory.

As seen in FIG. 11, the method may begin at step 1105 in which a broadcast computing device may evaluate a user (e.g., a subscriber) and a route. For example, in step 1105, the broadcast computing device may evaluate characteristics of content items selected by a subscriber, such as, for example, what the content is and its associated type. For example, the broadcast computing device may evaluate whether the content is a movie or music selection, and if the selection is for adults or for children, and the like. Additionally or alternatively, the broadcast computing device may evaluate past behavior of the subscriber during specific times and locations. For example, the broadcast computing device may determine that while the subscriber is driving to drop off the kids at school, the subscriber typically selects kids programming. For example, the broadcast computing device may determine that while the subscriber is driving to work, the subscriber typically selects music. Additionally or alternatively, the broadcast computing device may determine available content access points quality capabilities (e.g., low definition or high definition). Additionally or alternatively, the broadcast computing device may determine targeted content access points that are located near other businesses or advertising zone along the route.

In step 1110, the broadcast computing device may select ad content. For example, in step 1110, the broadcast computing device may select the ad content based on the evaluation of the subscriber. For example, if the subscriber is going to the school in the morning to drop off her kids, ad content for children may be selected by the broadcast computing device. For example, if the route passes an off ramp, the broadcast computing device may select ad content of food or lodging places near (e.g., within a predefined distance of) the off ramp. In some embodiments, the ad content may be associated with a broadcast content provider of the subscriber. Additionally or alternatively, in some embodiments, the ad content may be associated with another different broadcast content provider.

In step 1115, the broadcast computing device may select a planned content access point along the route to insert the ad content into the segment assigned to that planned content access point. For example, in step 1115, the broadcasting computing device may select a planned content access point geographically near (e.g., within a defined distance of) the business associated with the selected ad content. For example, the broadcast computing device may select a planned content access point near an off ramp to insert ad content of food or lodging places that are near the off ramp.

In step 1120, the broadcast computing device may send the ad content to the selected planned content access point if the ad content is not already pre-stored at the planned content access point. For example, in step 1120, the broadcast computing device may send the ad content for food or lodging near an off ramp to the selected planned content access point near (e.g., within a defined distance of) the off ramp.

In step 1125, the planned content access point may insert the ad content into the segment assigned to that planned content access point. For example, in step 1125, in response to receiving the ad content, the planned content access point may store the ad content and insert the ad content into a segment received by the planned content access point.

Additionally or alternatively, in some embodiments, the ad content may be pre-stored at a content access point. In other words, the broadcast computing device may send the ad content to the content access point prior to evaluating the subscriber. In some embodiments, the ad content may be inserted into any segment sent to a mobile computing device. In some embodiments, the ad content may be associated with a broadcast content provider different from a broadcast content provider associated with the content access point. In an exemplary embodiment, a content access point near (e.g., within a defined distance of) an off ramp may store ad content for food or lodging near the off ramp and may automatically insert such ad content into any segments it receives from a broadcast computing device.

In step 1130, the planned content access point may connect with a receiver (e.g., the mobile computing device)

of a mobile vehicle and send at least the segment including the inserted ad content. As a result, the mobile computing device within the mobile vehicle may playback the segment including the inserted ad content. For example, while an occupant of the mobile vehicle is watching a movie on the mobile computing device, an ad for a local restaurant may be played while the mobile vehicle is near (e.g., within a defined distance of) the local restaurant.

In some embodiments, the planned content access point may report the insertion of the ad to an ad server associated with the broadcast computing device or another different broadcast computing device. The ad server may report distribution of the ad to the business or entity associated with the ad. The report may include, for example, the time of day the ad was distributed, the occupants to whom the ad was distributed, demographic summaries of the distribution, frequency of distribution summaries, and the like.

Figure 12:
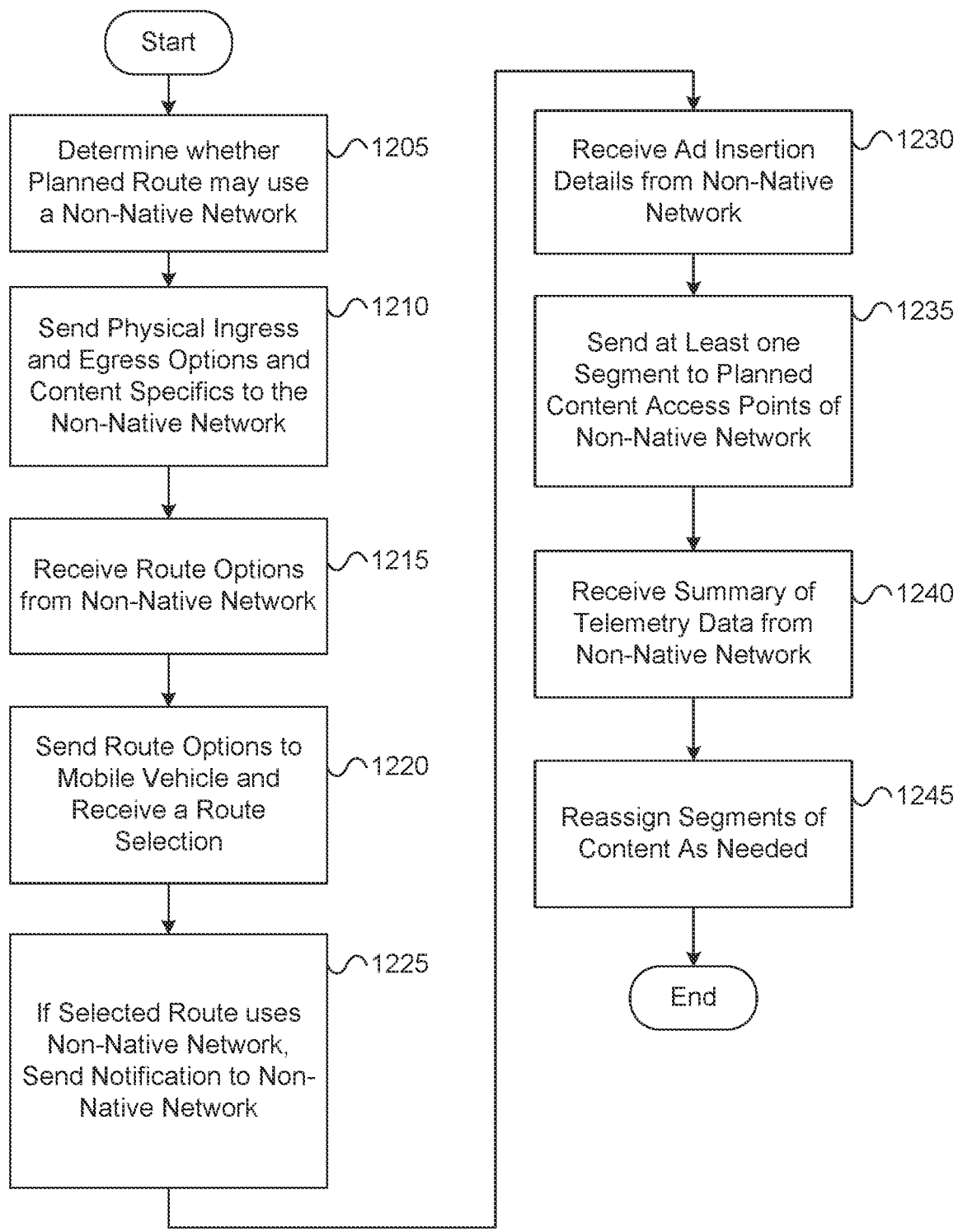
FIG. 12 illustrates a flowchart of an exemplary method in accordance with one or more illustrative aspects discussed herein.

FIG. 12 illustrates a flowchart of an exemplary method of providing selected content to a mobile vehicle along a route in conjunction with a non-native network in accordance with one or more illustrative aspects discussed herein. In one or more embodiments, the method of FIG. 12 and/or one or more steps thereof may be performed by a computing device (e.g., computing device 200). In other embodiments, the method illustrated in FIG. 12 and/or one or more steps thereof may be embodied in computer-executable instructions that are stored in a computer-readable medium, such as a non-transitory computer-readable memory.

As seen in FIG. 12, the method may begin at step 1205 in which a broadcast computing device may determine whether one or more potential routes may use a non-native network. For example, in step 1205, the broadcast computing device may be associated with a native network (e.g., a network of a first broadcast content provider). The broadcast computing device may determine each available content access provider associated with the native network and may determine the distances between each of these available content access providers. The broadcast computing device may determine that for a particular portion of a route there is too much distance (e.g., distance greater than a predetermined number) between two content access providers of the network and that a mobile computing device receiving the segments of content would not have enough of the segments stored to play the content until the mobile vehicle reached the next content access point. As a result, if non-native content access points are not used, there may be interrupt in the playback of the content at the mobile computing device. Accordingly, in such an instance, the broadband computing device may determine that a route may use a non-native network (e.g., content access points associated with a second broadcast content provider different from the first broadcast content provider).

In step 1210, the broadcast computing device may send physical ingress and egress options and content specifics to the non-native network. For example, in step 1210, the broadcast computing device may determine the regions with insufficient content access points and its associated ingress and egress options and send the options to a non-native broadcast computing device (also referred to herein as the non-native network). The content specifics may include the name of the content, the duration of the content, the particular segments that need to be transmitted to non-native content access points, and the like. The non-native network (e.g., the second broadcast content provider) may, based on the received ingress and egress options and the content specifics, determine route options and content access points of the non-native network to send the segments of the content items.

In step 1215, the broadcast computing device may receive non-native route options from the non-native network. For example, in step 1215, the broadcast computing device may receive one or more routes connecting the ingress options and the egress options. Further, the broadcast computing device may also receive identifiers of the associated content access points of the non-native network for each of the non-native route options.

In step 1220, the broadcast computing device may send the non-native route options to the mobile vehicle and, in response, may receive a route selection. For example, in step 1220, the broadcast computing device may integrate the non-native route options with the portions of the one or more routes supported by the native network. The broadcast computing device may send the plurality of integrated (e.g., hybrid) routes to a mobile computing device within the mobile vehicle. The mobile computing device may display to a user the plurality of integrated routes and, in response, may receive route selection from the user and may send the route selection to the broadcast computing device.

In step 1225, the broadcast computing device may determine if the selected route uses the non-native network and, if so, may send a notification to the non-native network. For example, in step 1225, the broadcast computing device may analyze the route selected by the user and may determine if the route is one of the routes that includes a portion of a route from the non-native network. In response to a determination that the selected route uses the non-native network, the broadcast computing device may send a notification to the non-native network. The notification may include an indication of a particular non-native route option based on the user selected route.

In step 1230, the broadcast computing device may receive from ad insertion details from the non-native network. For example, in step 1230, the ad insertion details may include one or more of a copy of the ad, an indication of the ad's duration, type and/or quality level (e.g., high definition). The ad insertion details may an indication of which content access point the ad will be sent to for insertion into a segment of content. For example, particular content access point may be a content access point on the non-native network or a content access point on the native network.

In step 1235, the broadcast computing device may send at least one segment to each respective planned content access point of the non-native network. For example, in step 1235, the broadcast computing device may send the appropriate segment to the assigned non-native planned content access point. The non-native planned content access point may insert an ad into the received segment. The non-native planned content access point may connect with the mobile computing device when the mobile vehicle is within range of the non-native planned content access point and send the segment including the inserted ad to the mobile computing device.

In some embodiments, broadcast computing device may send an SSID to the non-native planned content access point and a MAC address of the mobile computing device to facilitate establishment of the connection between the non-native planned content access point and the mobile computing device.

In step 1240, the broadcast computing device may receive a summary of telemetry data from the non-native network. For example, in step 1240, the non-native network may receive telemetry data from one or more the non-native planned content access points and/or the mobile vehicle. The non-native network may summarize or aggregate the received telemetry data and send the telemetry data to the broadcast computing device of the native network.

In step 1245, the broadcast computing device may analyze the received telemetry data and reassign at least portions of segments of the content as needed. For example, in step 1245, the broadcast computing device may reassign at least portions of segments from a native planned content access point to a non-native planned content access point, from a non-native planned content access point to a native planned content access point, from a first native planned content access point to a second native planned content access point, and/or from a first non-native planned content access point to a second non-native planned content access point. The reassignment of at least portions of one or more segments may be performed by the broadcast computing device in a similar manner as discussed above in connection with FIGS. 9 and 10. As illustrated above, various aspects of the disclosure relate to providing media content to occupants in moving vehicles. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

The invention claimed is:

1. One or more non-transitory computer-readable media storing instructions that, when executed, cause:
   determining a plurality of routes for a mobile computing device associated with a mobile vehicle, wherein each of the plurality of routes comprises a plurality of content access points of a content service provider associated with playback of a media content item on the mobile computing device;
   determining, for each of the plurality of routes:
      a predicted duration of time the mobile computing device will be within range of one of the plurality of content access points for the corresponding route, and
      a predicted transmission speed for one of the plurality of content access points for the corresponding route;
   determining, based on the predicted durations of time and the predicted transmission speeds, a particular route of the plurality of routes; and
   sending, to a first content access point of the content service provider of the particular route, a first portion of the media content item to be provided by the first content access point to the mobile computing device.

2. The one or more non-transitory computer-readable media of claim 1, wherein the instructions, when executed, further cause:
   determining a portion size, of the first portion of the media content item, based on:
      a quantity of the plurality of content access points of the particular route, and
      available memory at the first content access point.

3. The one or more non-transitory computer-readable media of claim 1, wherein the instructions, when executed, further cause:
   sending, to a second content access point of the content service provider, prior to an anticipated time that the mobile computing device is expected to be within transmission range of the second content access point, a second portion of the media content item.

4. The one or more non-transitory computer-readable media of claim 1, wherein the instructions, when executed, further cause:
   after determining that the mobile computing device associated with the mobile vehicle has connected to the first content access point, causing the first content access point to send the first portion of the media content item.

5. The one or more non-transitory computer-readable media of claim 1, wherein the instructions, when executed, further cause:
   determining an approximate geographic location of the mobile computing device based on:
      a geographic location of a last content access point with which the mobile computing device registered, and
      the particular route; and
   after determining that a difference between the approximate geographic location and an original predicted geographic location satisfies a predetermined threshold value, sending a second portion of the media content item, initially assigned to a later content access point, to an earlier content access point of the particular route.

6. The one or more non-transitory computer-readable media of claim 1, wherein the content service provider is associated with a Wi-Fi network or a cellular network.

7. The one or more non-transitory computer-readable media of claim 1, wherein the instructions, when executed, further cause:
   dividing the media content item into a plurality of portions,
   wherein the plurality of portions is based on a quantity of the plurality of content access points for the particular route and a plurality of predicted locations of the mobile computing device along the particular route at respective predicted times.

8. The one or more non-transitory computer-readable media of claim 1, wherein the instructions, when executed, further cause:
   dividing the media content item into a plurality of portions; and
   assigning each portion, of the plurality of portions, in chronological order, to a respective content access point, of the plurality of content access points for the particular route, based on an order in which the plurality of content access points for the particular route will be traversed by the mobile computing device as the mobile computing device moves along the particular route.

9. The one or more non-transitory computer-readable media of claim 1, wherein the instructions, when executed, further cause:
   dividing the media content item into a plurality of portions, wherein a size of one of the plurality of portions is determined based on whether the predicted transmission speed is above a predetermined threshold.

10. One or more non-transitory computer-readable media storing instructions that, when executed, cause:
   determining whether a first content service provider has sufficient network coverage, along a particular route, to provide, to a mobile computing device associated with a mobile vehicle, a predicted playback resolution of a media content item while the mobile vehicle traverses the particular route;

sending, based on the predicted playback resolution and to a computing device associated with a second content service provider:
an identification of an egress content access point, of the first content service provider, along the particular route,
an identification of an ingress content access point, of the first content service provider, along the particular route, and
a request to use network coverage, provided by the second content service provider, along the particular route between the egress content access point and the ingress content access point;
receiving, from the computing device associated with the second content service provider, an indication of at least one route segment between the egress content access point and the ingress content access point; and
integrating the at least one route segment with the particular route.

11. The one or more non-transitory computer-readable media of claim 10, wherein the instructions, when executed, further cause:
sending, to the mobile computing device, an indication of a plurality of routes;
receiving, from the mobile computing device, a selection of the particular route; and
dividing the media content item into a plurality of portions, wherein a portion size of at least one portion, of the plurality of portions, is determined based on:
a gap in network coverage between:
a first planned content access point of a plurality of planned content access points of the particular route, and
a second planned content access point of the plurality of planned content access points of the particular route, and
available memory at the first planned content access point; and
sending each portion to a respective planned content access point of the plurality of planned content access points of the particular route.

12. The one or more non-transitory computer-readable media of claim 10, wherein the egress content access point is an access point where the mobile computing device is predicted to leave network coverage of the first content service provider, wherein the ingress content access point is an access point where the mobile computing device is predicted to enter network coverage of the first content service provider, wherein the first content service provider is associated with a Wi-Fi network, and wherein the second content service provider is associated with a cellular network.

13. The one or more non-transitory computer-readable media of claim 10, wherein a user of the mobile computing device has a subscription with the first content service provider, and wherein the user of the mobile computing device does not have a subscription with the second content service provider.

14. The one or more non-transitory computer-readable media of claim 10, wherein the media content item is associated with the first content service provider, and the instructions, when executed, further cause:
dividing the media content item into a plurality of portions;
caching, by a particular content access point, an advertisement associated with the second content service provider; and
inserting, by the particular content access point, the advertisement into a portion, of the plurality of portions, received at the particular content access point.

15. A system comprising:
a first computing device; and
a first content access point of a plurality of content access points of a content service provider;
wherein the first computing device comprises:
one or more first processors; and
memory storing first instructions that, when executed by the one or more first processors of the first computing device, configure the first computing device to:
determine a plurality of routes for a mobile computing device associated with a mobile vehicle, wherein each of the plurality of routes comprises one or more of the plurality of content access points of the content service provider associated with playback of a media content item on the mobile computing device;
determine, for each of the plurality of routes:
a predicted duration of time the mobile computing device will be within range of one of the plurality of content access points for the corresponding route, and
a predicted transmission speed for one of the plurality of content access points for the corresponding route;
determine, based on the predicted durations of time and the predicted transmission speeds, a particular route of the plurality of routes; and
send, to the first content access point of the content service provider of the particular route, a first portion of the media content item to be provided by the first content access point to the mobile computing device, and
wherein the first content access point comprises:
one or more second processors; and
memory storing second instructions that, when executed by the one or more second processors of the first content access point, configure the first content access point to:
receive the first portion of the media content item to be provided to the mobile computing device.

16. The system of claim 15, wherein the first instructions, when executed by the one or more first processors, configure the first computing device to:
determine a portion size, of the first portion of the media content item, based on:
a quantity of the plurality of content access points of the particular route, and
available memory at the first content access point.

17. The system of claim 15, wherein the first instructions, when executed by the one or more first processors, configure the first computing device to:
send, to a second content access point of the content service provider, prior to an anticipated time that the mobile computing device is expected to be within transmission range of the second content access point, a second portion of the media content item.

18. The system of claim 15, wherein the first instructions, when executed by the one or more first processors, configure the first computing device to:
after determining that the mobile computing device associated with the mobile vehicle has connected to the first content access point, configure the first content access point to send the first portion of the media content item.

19. The system of claim 15, wherein the first instructions, when executed by the one or more first processors, configure the first computing device to:
   determine an approximate geographic location of the mobile computing device based on:
      a geographic location of a last content access point with which the mobile computing device registered, and
      the particular route; and
   after determining that a difference between the approximate geographic location and an original predicted geographic location satisfies a predetermined threshold value, send a second portion of the media content item, initially assigned to a later content access point, to an earlier content access point of the particular route.

20. The system of claim 15, wherein the content service provider is associated with a Wi-Fi network or a cellular network.

21. The system of claim 15, wherein the first instructions, when executed by the one or more first processors, configure the first computing device to:
   divide the media content item into a plurality of portions, wherein the plurality of portions is based on a quantity of the plurality of content access points for the particular route and a plurality of predicted locations of the mobile computing device along the particular route at respective predicted times.

22. The system of claim 15, wherein the first instructions, when executed by the one or more first processors, configure the first computing device to:
   divide the media content item into a plurality of portions; and
   assign each portion, of the plurality of portions, in chronological order, to a respective content access point, of the plurality of content access points for the particular route, based on an order in which the plurality of content access points for the particular route will be traversed by the mobile computing device as the mobile computing device moves along the particular route.

23. The system of claim 15, wherein the first instructions, when executed by the one or more first processors, configure the first computing device to:
   divide the media content item into a plurality of portions, wherein a size of one of the plurality of portions is determined based on whether the predicted transmission speed is above a predetermined threshold.

24. A system comprising:
   a first computing device associated with a first content service provider; and
   a second computing device associated with a second content service provider;
   wherein the first computing device comprises:
      one or more first processors; and
      memory storing first instructions that, when executed by the one or more first processors of the first computing device, configure the first computing device to:
         determine whether the first content service provider has sufficient network coverage, along a particular route, to provide, to a mobile computing device associated with a mobile vehicle, a predicted playback resolution of a media content item while the mobile vehicle traverses the particular route;
         send, based on the predicted playback resolution and to the computing device associated with the second content service provider:
            an identification of an egress content access point, of the first content service provider, along the particular route,
            an identification of an ingress content access point, of the first content service provider, along the particular route, and
            a request to use network coverage, provided by the second content service provider, along the particular route between the egress content access point and the ingress content access point;
         receive, from the second computing device associated with the second content service provider, an indication of at least one route segment between the egress content access point and the ingress content access point; and
         integrate the at least one route segment with the particular route, and
   wherein the second computing device comprises:
      one or more second processors; and
      memory storing second instructions that, when executed by the one or more second processors of the second computing device, configure the second computing device to:
         send an indication of at least one route segment between the egress content access point and the ingress content access point.

25. The system of claim 24, wherein the first instructions, when executed by the one or more first processors, configure the first computing device to:
   send, to the mobile computing device, an indication of a plurality of routes;
   receive, from the mobile computing device, a selection of the particular route; and
   divide the media content item into a plurality of portions, wherein a portion size of at least one portion, of the plurality of portions, is determined based on:
      a gap in network coverage between:
         a first planned content access point of a plurality of planned content access points of the particular route, and
         a second planned content access point of the plurality of planned content access points of the particular route, and
      available memory at the first planned content access point; and
   send each portion to a respective planned content access point of the plurality of planned content access points of the particular route.

26. The system of claim 24, wherein the egress content access point is an access point where the mobile computing device is predicted to leave network coverage of the first content service provider, wherein the ingress content access point is an access point where the mobile computing device is predicted to enter network coverage of the first content service provider, wherein the first content service provider is associated with a Wi-Fi network, and wherein the second content service provider is associated with a cellular network.

27. The system of claim 24, wherein a user of the mobile computing device has a subscription with the first content service provider, and wherein the user of the mobile computing device does not have a subscription with the second content service provider.

28. The system of claim 24, wherein the media content item is associated with the first content service provider, and the first instructions, when executed by the one or more first processors, configure the first computing device to:

divide the media content item into a plurality of portions;
cause a particular content access point to cache an advertisement associated with the second content service provider; and
cause the particular content access point to insert the advertisement into a portion, of the plurality of portions, received at the particular content access point.

\* \* \* \* \*